United States Patent [19]
Kawasaki et al.

[11] Patent Number: 5,227,832
[45] Date of Patent: Jul. 13, 1993

[54] CAMERA SYSTEM

[75] Inventors: Masahiro Kawasaki; Hiroyuki Takahashi; Shigeru Iwamoto, all of Tokyo, Japan

[73] Assignee: Asahi Kogaku Kogyo Kabushiki Kaisha, Tokyo, Japan

[21] Appl. No.: 748,784

[22] Filed: Aug. 22, 1991

[30] Foreign Application Priority Data

Nov. 22, 1990 [JP] Japan .................................. 2-320464

[51] Int. Cl.⁵ .......................... G03B 13/22; G03B 3/00; G03B 7/20
[52] U.S. Cl. ...................................... 354/402; 354/412
[58] Field of Search ................. 354/412, 402, 400, 286

[56] References Cited
U.S. PATENT DOCUMENTS

| | | | |
|---|---|---|---|
| 4,329,029 | 5/1982 | Haskell | 354/289 X |
| 4,382,669 | 5/1983 | Tano et al. | 354/268 |
| 4,420,239 | 12/1983 | Yasuyuki et al. | 354/286 |
| 4,477,164 | 10/1984 | Nakai et al. | 354/412 X |
| 4,509,842 | 4/1985 | Taniguchi et al. | 354/403 |
| 4,560,267 | 12/1985 | Nakai et al. | 354/412 |
| 4,602,861 | 7/1986 | Taniguchi et al. | 354/402 |
| 4,673,275 | 6/1987 | Nakai et al. | 354/412 |
| 4,812,868 | 3/1989 | Utagawa et al. | 354/402 |
| 4,835,561 | 5/1989 | Matsui | 354/403 |
| 4,841,322 | 6/1989 | Kawasaki et al. | 354/400 |
| 4,890,133 | 12/1989 | Ogawa | 354/402 |
| 4,912,493 | 3/1990 | Tanaka | 354/400 |
| 4,945,376 | 7/1990 | Kawasaki et al. | 354/400 |

Primary Examiner—Michael L. Gellner
Assistant Examiner—Jae N. Noh
Attorney, Agent, or Firm—Sandler, Greenblum & Bernstein

[57] ABSTRACT

A camera system including a camera body and a photographing lens detachably mounted to the camera body including a memory for storing function data on the aberration correction peculiar to the taking lens, an arithmetic operating device for calculating necessary aberration correction data in accordance with the aberration correction function data stored in the memory, and an output device for outputting the calculated aberration correction data to the camera body.

22 Claims, 13 Drawing Sheets $a_1 > 0, b_1 < 0$ $a_2 < 0, b_2 = 0$ $a_3 < 0, b_3 > 0$ $a_4 < 0, b_4 = 0$

CAMERA SYSTEM

BACKGROUND OF THE INVENTION

1. Field of the Invention

The present invention relates to a camera system, and more precisely, it relates to a camera system of an automatic focusing single lens reflex camera having an automatic focusing taking lens with a microcomputer.

2. Description of Related Art

In recent single lens reflex cameras, an automatic focusing devices are usually provided. Frequently, a TTL phase difference detection type of focus detecting means is provided in a single lens reflex camera to detect a focus thereof. The TTL phase difference detection type of focus detecting device calculates a deviation (amount of defocus) of an image plane from a film plane which is caused by the phase difference between the two divided images of an object to be taken which are formed through a taking lens (photographing lens). The necessary displacement of the focusing lens within the taking lens is calculated in accordance with the amount of defocus so that the focusing lens is moved to a focal point by a focusing motor through the calculated displacement.

The relationship between the amount of defocus and the displacement of the focusing lens depends on the taking lens and varies in accordance with the aberration of the photographing lens. To this end, in a conventional single lens reflex camera, the photographing lens (interchangeable lens) is provided with a memory means (e.g., ROM) in which lens data peculiar to the photographing lens, such as data (K value data, etc.) relating to the amount of defocus and displacement of the focusing lens is stored. A microcomputer provided in the camera body has a data communication function in which the lens data stored in the ROM of the photographing lens is read. The K value data referred to herein means a constant of a unit displacement of an image plane (focusing plane) which is characteristic of the taking lens and the number of revolutions of the AF motor.

Recently, photographing lenses in automatic focusing (AF) single lens reflex cameras have used a zoom lens in which the K value data varies in accordance with the focal length f thereof. To this end, a focal length detecting means is provided on the zoom lens to detect the present focal length, and the K value data corresponding to the focal lengths is stored in the lens ROM.

However, control of the focal length detecting means and retrieval of the K value data must be carried out by the microcomputer of the camera body (body microcomputer). This increases the communication time and load on the body microcomputer.

Generally speaking, there is always some degree of aberration in a photographing lens. For instance, there is chromatic aberration (lateral and longitudinal magnification aberrations), spherical aberration, astigmatism, coma, curvature of the field, distortion, etc. These aberrations have a large influence on the TTL automatic focus adjustment, and accordingly, it is preferable to make the necessary corrections, using the aberrations.

However, if all aberration data corresponding to the plurality of focal lengths f is stored in the lens ROM in a known page-memory system, it is necessary to use a large capacity lens ROM, resulting in an increased load on the body microcomputer and increased operation time.

SUMMARY OF THE INVENTION

The primary object of the present invention is to provide a camera system in which precise focusing can be effected using aberration correction data, and wherein the operation load and operation time of the body microcomputer can be reduced.

The inventors of the present invention have found that the aberration characteristics of the photographing lens vary in accordance with a certain function or an approximation thereof.

To achieve the object mentioned above, according to the present invention, there is provided a camera system including a camera body and a photographing lens which is detachably mounted to the camera body. The photographing lens includes a memory means for storing function data on the aberration correction peculiar to the photographing lens, an arithmetic operating means for calculating necessary aberration correction data in accordance with the aberration correction function data stored in the memory means, and an output means for outputting the calculated aberration correction data to the camera body.

With this arrangement, the aberration correction data can be obtained without increasing the load on the camera body. If the invention is applied to a camera system having an automatic focusing means, a more accurate automatic focusing can be effected without increasing the load on the camera body.

The present disclosure relates to subject matter contained in Japanese patent application No. 02-320464 (filed on Nov. 22, 1990) which is expressly incorporated herein by reference in its entirety.

BRIEF DESCRIPTION OF THE DRAWINGS

The invention will be described below in detail with reference to the accompanying drawings, in which.

DESCRIPTION OF THE PREFERRED EMBODIMENTS

FIGS. 1A through 1D are diagrams showing relationships between the focal length f and the open aberration (lateral magnification chromatic aberration) in a zoom lens. In FIG. 1, the abscissa represents the focal length f and the ordinate represents the amount of aberration A. As can be seen from these graphs, the aberration characteristics ①, ②, ③ and ④ vary in accordance with certain functions in the focal length areas before and after a reference focal length f1 (inflection point).

Figure 1A:
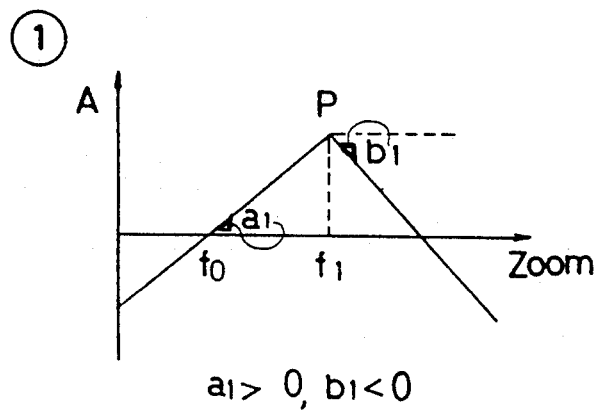
FIGS. 1A, 1B, 1C and 1D are diagrams showing different aberration characteristics according to the present invention.

In FIG. 1A, the amount of aberration A is maximum (maximum value is P) at the focal length f1. From a1>0, and b1<0, the amount of aberration A is approximated by the equations (1) and (2) below when f≦f1 and f≧f1, respectively;

$$A = a_i(f - f0), \text{ where } i = 1,2,3,4 \quad (1)$$

$$A = b_i(f - f1) + P, \text{ where } i = 1,2,3,4 \quad (2)$$

Figure 1B:
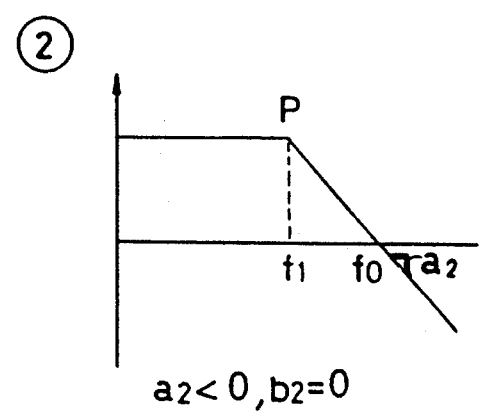
Figure 1C:
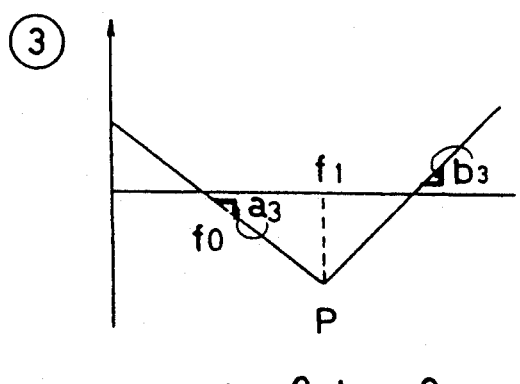
Figure 1D:
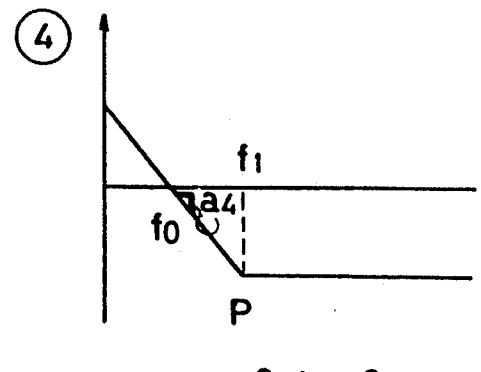

The maximum value P is given by;

$$P \approx a_i(f - f1),$$

where $i = 1,2,3,4 \ldots$;
and where;
$a_i = \Delta A/\Delta f$ for $f < f1$
$b_i = \Delta A/\Delta f$ for $f \geq f1$ The aberration characteristics shown in FIG. 1B are obtained when a2≠0 (f≧f1) in equation (1), and a2=0, b2<0 (f≦f1) in equation (2), respectively. Similarly, in FIG. 1C, a3<0 in equation (1) and b3>0 in equation (2). In FIG. 1D, a4<0 in equation (1) and b4=0 in equation (2).

As can be seen from the characteristics mentioned above, the amount of aberration A is generally obtained by the following equations (3) and (4);

$$A = a(f - f0) \quad (3)$$

$$(F \leq f1)$$

$$A = b(f - f1) + a(f1 - f0) \quad (4)$$

$$(F \geq f1)$$

- Note that in the case of FIG. 1B, the characteristics are obtained by equations (4) and (3) when f≦f1 and f≧f1, respectively.

The above equations are examples, but the aberration characteristics are generally and approximately represented by a certain function in accordance with the focal length f and the aperture (diaphragm value Av).

The aberration correction data A is the data necessary to correct the focus in an automatic focusing device of a single lens reflex camera. To correct the focus, the following aberration correction data B, C and D are required in addition to the amount of aberration A;

B: close distance aberration correction value
C: stop-down aberration correction value
D: coefficient These data B, C and D are stored as lens data in the memory of the photographing lens. These data are input to the camera body through a data communication to correct the focus. An example of the formulae for correcting the focus is as follows;

for open aperture ~1.5 stage aperture
4(A − 16)/256 + (B − 3)N/256 and,
for more than 1.5 stage aperture
8(C − 8)/256 + (B − 3)ND/256

One of the most significant features of the present invention resides in that the aberration correction data A corresponding to the focal length f and/or the aperture Av is calculated in accordance with the function corresponding to the aberration characteristics and the data f0, f1, a and b on the lens side, and the calculated aberration correction data is then transferred to the camera body.

The following discussion will be directed to a single lens reflex camera to which the present invention is applied, with reference to FIGS. 2 through 9.

The camera body 1 has a main CPU 10 and an indication CPU 11 as a control means. The main CPU 10 generally controls the whole camera system and performs arithmetic operations of various data necessary for taking a picture. The indication CPU 11 has a data inputting function through switching members, an interface function for transmitting and receiving data (signals) to and from the zoom lens 2, and a control function for controlling the indication of the photographing data.

The indication CPU 11 is connected to an LCD panel 12 which indicates the photographing data and a DX code input circuit 13 which reads at least ISO sensitivity data of a film from DX codes provided on a surface of a patrone of the film.

A light receiver 14, which receives light incident thereon through the zoom lens 2 and outputs analog signals corresponding to the amount of light received, is connected to the main CPU 10 through an A/D converter 15.

The main CPU 10 is also connected to, an exposure control circuit 16 which drives and controls a shutter mechanism (not shown) and a diaphragm mechanism (not shown), etc., in accordance with the input photographing data; a CCD processing circuit 18 which detects the focus state of the zoom lens 2 in response to focus data of the object to be taken, output from an automatic focusing CCD object distance measuring sensor 17; an AF motor control circuit 20 which in turn controls the drive of an AF motor 19 which drives a focusing mechanism (focus adjustment mechanism) 31 of the zoom lens 2; and an AF pulser 21 which detects the amount of rotation (angular displacement or number of revolution) of the AF motor 19 to generate pulses corresponding to the angular displacement. The CCD object distance measuring sensor 17 outputs a predetermined focus data signal (defocus data) in accordance with the two-divided images of the object formed by the zoom lens 2.

The AF motor 19 drives a focusing mechanism 31 of the zoom lens 2 through a coupler 19a, which is provided on a body mount BM of the camera body and projects therefrom, and drives a coupler 31a provided on a lens mount LM of the zoom lens 2 when the connection between the couplers 19a and 31a is established.

A battery 22 powers not only the electronic components and electronic circuits in the camera body 1, but also the motor and electronic circuits in the zoom lens 2.

In the zoom lens 2 are provided a lens CPU 30 as a lens controlling means, a focusing mechanism 31 which rotates a focus adjusting cam ring (not shown) to relatively move the focusing lens groups in the optical axis direction to thereby effect the focusing, and a zooming mechanism 32 which rotates a zoom ring (not shown) to relatively move at least two groups of variable power lenses in the optical axis direction to effect the zooming.

The lens CPU 30 includes a ROM 30A and a RAM 30B. The ROM 30A stores therein predetermined microprograms and algorithms for performing the operations including the automatic focusing operation, and steady data, etc. The RAM 30B stores therein the lens data to be transferred to the camera body 1.

The focusing mechanism 31 is connected to a coupler 31a, which is electrically connected to the coupler 19a when the zoom lens 2 is attached to the camera body 1, to transmit the rotational drive of the AF motor 19 to the focusing mechanism 31. The focusing mechanism 31 rotates the focus adjusting cam ring with the help of the rotational drive force.

The couplers 19a and 31a can be disconnected from one another by a disengaging means (not shown), so that a photographer can manually rotate a focus adjusting operation ring to adjust the focus in the manual focusing mode.

The zooming mechanism 32 is driven by a PZ (power zoom) motor 34 controlled by a PZ motor driving portion 33. The PZ motor driving portion 33 is controlled by the lens CPU 30. The lens CPU 30 is controlled in accordance with the set auto power zoom mode or the operation of the zoom switch SWPZ2 (FIG. 5) in the auto power zoom mode, and in accordance with the output of the zoom operation code plate 38 which is manually actuated by a photographer in the manual power zoom mode, respectively. The auto power zoom mode and the manual power zoom mode are selected by the lens CPU 30 in response to the operation of a zoom switch SWPZ1.

To the lens CPU 30 are connected a PZ pulser 35 which detects the displacement (number of revolutions) of the PZ motor 34 and generates a predetermined number of pulses corresponding thereto, a distance code plate 36 which reads position data (object distance data) of the focus adjusting cam ring (focusing lens groups) driven by the focusing mechanism 31, a zoom code member 37 which reads the position data (focal length data) of the zooming cam ring (variable power lens groups) driven by the zooming mechanism 32, and a zoom operation code plate 38 which inputs data of the direction and speed of the power zooming by the operation of the zoom operation switches SWPZ1 and SWPZ2.

Note that if the zoom lens is a single focus macro lens, since the displacement of the focusing lens group in the optical axis direction is increased, a zoom code member 37 which can provide more information can be used as an object distance data inputting means, in place of the distance code member 36.

To the lens CPU 30 are also connected a lens judgement code member 39 which judges the kind of photographing lens (zoom lens, single focus lens, or single focus macro lens, etc.), and a K value input member 40 which inputs data of the K value at a telephoto extremity. In the illustrated embodiment, the K value input member 40 forms K value data represented by a plurality of bits in combination of ON and OFF of the several switches. The "K value" means the number of pulses of the AF pulser 21 necessary for moving an image plane formed by the zoom lens 2 through a unit displacement, but is not limited thereto.

Each of the distance code members 36 and the other code members are usually comprised of a code plate secured to the peripheral surface of the cam ring or the like, which is rotated during zooming or focusing etc., and brushes secured to the stationary lens barrel which have a plurality of electrical contacts independently brought into slide contact with the codes of the associated code plate. The positions of the cam rings are detected as bit information by the combination of the codes ("H" and "L") with which the electrical contacts of the brushes come into contact.

A lens interface 41 is connected to a data input terminal of the lens CPU 30. The data communication between the lens CPU 30 and the indication CPU 11 is effected through the lens interface 41 to which a macro code member 42 is connected to input macro data thereto in the macro mode.

The camera body 1 is provided with a known retractable strobe light emitting unit 45 having an auxiliary infrared light emitting member 44. The strobe light emitting unit 45 is supported by a supporting mechanism so as to move between a light emitting position and a retracted position in which the strobe light emitting unit 45 is retracted in the camera body 1.

The auxiliary infrared light emitting member 44 is provided on a strobe light emitting surface, so that when the strobe light emitting unit 45 is in the light emitting position, the auxiliary infrared light emitting member 44 emits a fringe pattern of infrared light onto an object to be taken if a release button (not shown) is pressed down by half step and if the object contrast is insufficient. The light emission of the auxiliary infrared light emitting member 44 is controlled by the main CPU 10 through a light emission control circuit 46.

Whether the strobe light emitting unit 45 is in the light emitting position is detected by a detecting member 47 which outputs the detection signal to the main CPU 10.

Figure 3:
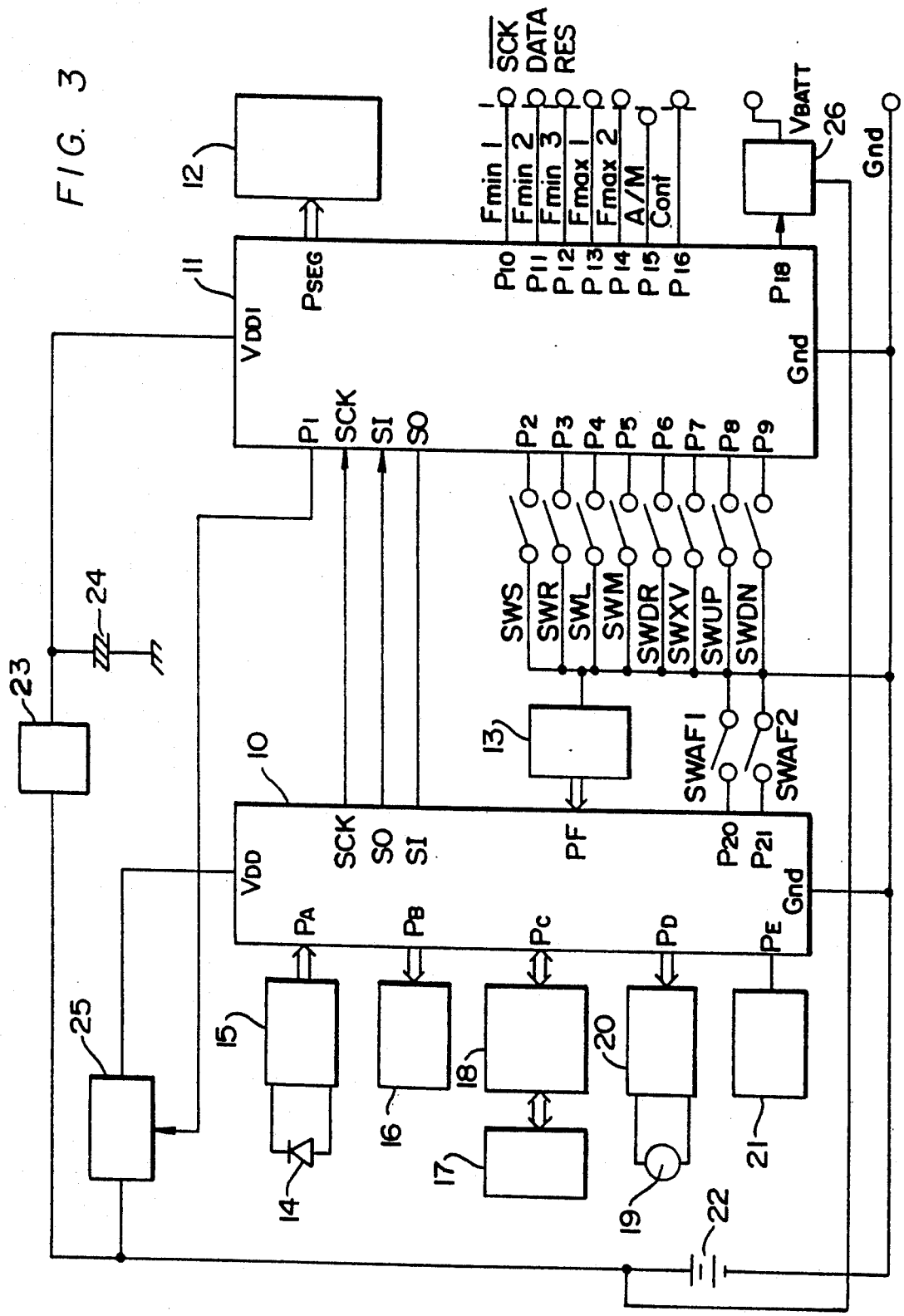
FIG. 3 is a block diagram of a main circuit arrangement of a camera body in a camera system shown in FIG. 2.
Figure 4:
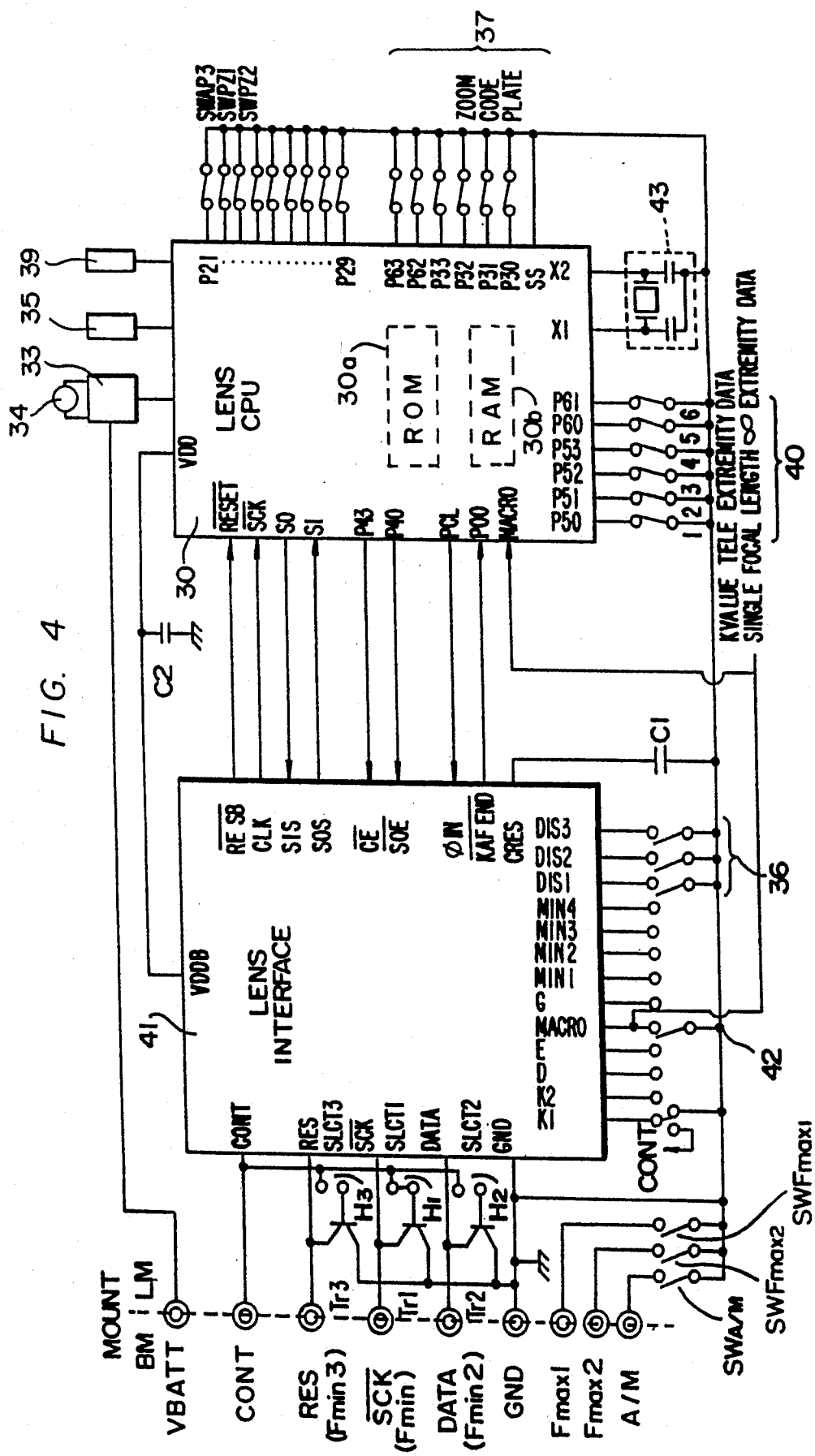
FIG. 4 is a block diagram of a main circuit arrangement of a photographing lens in a camera system shown in FIG. 2.

The arrangement of the control system of the camera body 1 and the zoom lens 2 will be described below in detail with reference to FIGS. 3 and 4. FIG. 3 is a block diagram of a main construction of the electrical system of the camera body 1.

The voltage of the battery 22 which is controlled by a regulator 23 and which is backed up by a super capacitor 24 is supplied to a terminal VDD1 of the indication CPU 11. The indication CPU 11 is always activated at a constant voltage input to the terminal VDD1.

Terminals P1 and P2 of the indication CPU 11 are connected to a DC/DC converter 25 which turns the power source of the main CPU 10 ON and OFF and a photometer switch SWS which is turned ON when the shutter button (not shown) is pressed by a half step, respectively. Furthermore, terminals P3 and P4 of the indication CPU 11 are connected to a release switch SWR which is turned ON when the shutter button is fully pressed and a lock switch SWL which is turned ON when the camera is brought into a position suitable for photographing, respectively.

The DC/DC converter 25 is actuated when the lock switch SWL is turned ON and when the photometer switch SWS or the release switch SWR is turned ON, and in accordance with command from the indication CPU 11 upon inputting the lens data from the photographing lens 2, to supply the terminal VDD1 of the main CPU 10 with a reference constant voltage to thereby actuate the main CPU 10.

Furthermore, terminals P5, P6, P7, P8 and P9 of the indication CPU 11 are connected to a mode switch SWM, a drive switch SWDR, an exposure correction switch SWXV, an up-switch SWUP and a down-switch SWDN, respectively.

The indication CPU 11 operates in accordance with the operative and inoperative states of these switches SWM, SWDR, SWXV, SWUP, and SWDN. For instance, the exposure modes including a programmed exposure mode, an automatic exposure mode, and a manual exposure mode are selected in accordance with the operation of the mode switch SWM. Similarly, drive modes including a single shot mode and a continuous shot mode are selected in accordance with the operation of the drive switch SWDR. The selection modes can be varied in accordance with the operation of the up-switch SWUF and down-switch SWDN at the position in which the exposure modes or the drive modes can be selected.

The indication CPU 11 makes it possible to change the exposure value when the exposure switch SWXV is turned ON. Namely, the exposure value can be increased and decreased in accordance with the operation of the up-switch SWUP and the down-switch SWDN, respectively.

The indication CPU 11 has a group of indication control terminals PSEG connected to an indicating LCD 12 through a bus line. The indicating LCD 12 indicates the necessary photographing data in accordance with the command of the indication CPU 11 when the lock switch SWL is turned ON.

Seven terminals P10 through P16 of the indication CPU 11 are connected to electrical contacts Fmin1, Fmin2, Fmin3, Fmax1, Fmax2, A/M, and Cont provided on the body mount BM of the camera body, respectively. A terminal P18 of the indication CPU 11 is connected to a switch circuit 26.

The electrical contacts Fmin1, Fmin2 and Fmin3 also function as communication terminals for data communication between the photographing lens 2 and the indication CPU 11. Namely, the electrical contacts Fmin1, Fmin2 and Fmin3 constitute a serial clock signal inputting and outputting terminal $\overline{SCK}$, a data transmitting and receiving terminal DATA, and a reset signal outputting terminal RES, respectively. The terminals P10, P11 and P12 of the indication CPU 11 are always pulled up within the indication CPU 11.

The output of the switch circuit 26 is connected to a terminal VBATT and functions as a switch for establishing and breaking the electrical connection between the battery 22 and the terminal VBATT in accordance with the level of the terminal P18. The terminal Gnd of the indication CPU 11 is connected to the ground terminal Gnd of the battery 22.

The indication CPU 11 and the main CPU 10 communicate with each other through serial terminals SCK, serial-in terminals SI and serial-out terminals SO. In the data communication, data is transferred, for example using command codes.

Contact groups PA, PB, PC, PD, PE and PF of the main CPU 10 are connected to an A/D converter circuit 15, the exposure control circuit 16, the CCD processing circuit 18, the AF motor control circuit 20, the AF pulser 21, and the DX code input circuit 13, respectively.

The terminal P20 of the main CPU 10 is connected to a first AF switch SWAF1 which selects an auto focus mode in which the focusing is automatically effected by the AF motor 19 and a manual focus mode in which the focusing is manually effected by a photographer. The terminal P21 of the main CPU 10 is connected to a second AF switch SWAF2 which switches the mode of the shutter release between a focus priority mode and a release priority mode.

The lens mount LM of the zoom lens 2 is provided with electrical contacts VBATT, CONT, RES (Fmin3), $\overline{SCK}$ (Fmin1), DATA (Fmin2), GND, Fmax1, Fmax2 and A/M corresponding to the associated electrical contacts provided on the body mount BM when the zoom lens 2 is attached to the camera body 1. The electrical contacts of the lens mount are electrically connected to the corresponding electrical contacts of the body mount both of which are designated with the same reference numerals.

The contact VBATT on the lens side is connected to the PZ driver 33 so that the power of the battery 22 is directly supplied to the PZ motor 34 through the contact VBATT by the switching operation of the PZ driver 33.

The contacts Fmax1 and Fmax2 of the lens side function also as a steady information transmitting means for transmitting the minimum diaphragm F-number (maximum value) of two bits to the camera body, similarly to those provided on a conventional AE lens. Namely, the contacts Fmax1 and Fmax2 on the lens side are grounded through the switches SWmax1 and SWmax2 so that maximum F-number data is formed in accordance with a combination of the levels of the switches SWmax1 and SWmax2 depending on the combinations of ON/OFF states thereof.

The contact A/M on the lens side has the function of sending the auto/manual information of the diaphragm to the camera body 1 and is grounded through a selection switch SWA/M. The selection switch SWA/M is associated with the rotation of a diaphragm ring (not shown) of the photographing lens 2 so that when the diaphragm ring is in the auto position and the manual position, the selection switch is turned ON and OFF, respectively.

The contacts Fmin1, Fmin2, and Fmin3 on the lens side function not only as a steady information transmitting means for transmitting the open F-number information of three bits to the camera body 1, similarly to those provided on a conventional (old) AE lens, but also as data communication contacts between the camera body and the zoom lens.

To provide both the steady information transmitting function and the data communication function on the contacts Fmin1, Fmin2 and Fmin3 on the lens side, these contacts are connected to PNP transistors Tr1, Tr2 and Tr3, respectively. The PNP transistors Tr (Tr1, Tr2 and Tr3) are connected at the emitters thereof to the lens contacts Fmin1, Fmin2 and Fmin3, and at the bases thereof to the contact CONT through fuse portions H1, H2 and H3 so as to establish and break the connection, respectively. The collectors of the transistors are grounded. It is possible to provide the fuse portions H1, H2 and H3 between the emitters and the lens contacts Fmin (Fmin1, Fmin2 and Fmin3).

The indication CPU 11 causes the voltage of the contact CONT to drop to the ground in order to obtain the open F-number data from the lens contacts Fmin1, Fmin2 and Fmin3. As a result, a transistor (or transistors) Tr to which the fuse portion(s) is (are) connected is (are) turned ON, so that the emitter(s) of the transistor(s) which has (have) been turned ON become(s) high level "H", and the emitter(s) of the transistor(s) which has (have) not been turned ON become(s) ground level. Namely, the transistors Tr are selectively turned ON or OFF in accordance with the connection of the fuse portions H1, H2 and H3 to change the level of the emitters thereof. Consequently, the three-bit open F-number data is output to the lens contacts Fmin1, Fmin2 and Fmin3.

Terminals CONT, RES, $\overline{SCK}$, DATA and GND of the lens interface 41 is connected to the terminals CONT, Fmin3, Fmin1, Fmin2 and GND on the lens side, respectively.

The lens contact CONT is connected to the bases of the transistors Tr and to the terminal CONT of the lens interface 41, as mentioned above. The switching of the power supply from the terminal CONT of the lens interface is effected through the terminal RES (lens terminal Fmin3). After the data on the open F-number is read by the indication CPU 11, and when the terminals CONT and RES become levels "H" and "L", respectively, the power is supplied to the lens CPU 30.

The terminal VDDB of the lens interface 41 is connected to the terminal VDD of the lens CPU 30 through a condenser C2 so that the constant voltage supplied from the terminal CONT of the camera body 1 is supplied to the lens CPU 30.

Terminals DIS1, DIS2 and DIS3 of the lens interface 41 are connected to the distance code plate 36 which constitutes an initial value data forming means so that the distance data signals of the object distance corresponding to the position of the focusing cam ring driven by the focusing mechanism 31 are sent as three bit signals to the terminals DIS1, DIS2 and DIS3.

Terminal MACRO of the lens interface 41 is connected to the macro code portion 42 which functions as a macro switch and is turned ON when the zoom operation ring is actuated to switch the photographing lens 2 to the macro mode. It is also possible to form the macro code portion 42 with a part of the codes of the zoom code member 37 when the mode is switched to the macro mode by the zoom operation ring.

The input and output terminals of the lens interface 41 are connected to the corresponding input and output terminals of the lens CPU 30. Reset terminal $\overline{RESB}$, clock terminal CLK, serial-in terminal SIS, serial-out terminal SOS, terminal $\overline{CE}$, terminal $\overline{SOE}$, terminal ϕIN, and terminal $\overline{KAFEND}$, of the lens interface 41 are connected to the reset terminal $\overline{RESET}$, the serial clock terminal $\overline{SCK}$, the serial-out terminal SO, the serial-in terminal SI, the terminal P43, the terminal P40, the terminal PCL, the terminal POO, of the lens CPU 30, respectively. A terminal CRES of the lens interface 41 is grounded through a delay condenser C1.

The lens CPU 30 controls the rotation of the PZ motor 34 through the PZ driver 33 which is connected to the control terminal of the lens CPU 30. The lens CPU 30 is also connected to the PZ pulser 35 and the lens judgement code 39.

The terminals P30, P31, P32 and P33 and the terminals P62 and P63, of the lens CPU 30 are connected to the codes of the zoom code member 37. The lens CPU 30 performs the arithmetic operation based on the combination of input levels of these terminals P30, P31, P32, P33, P62, and P63 to obtain focal length data for a zoom lens and object distance data for a single focus macro lens.

The terminals P21 through P29 of the lens CPU 30 are connected to switches such as the auto focus switch SWAP3, the power zoom switches SWPZ1 and SWPZ2, etc. The terminals P24 through P29 are also connected to the zoom operation code member 38.

The zoom lens 2 is provided with a clock pulse generating circuit 43 as a clock outputting means. The lens CPU 30 operates synchronously with the clock pulses generated by the clock pulse generating circuit 43.

COMMUNICATION BETWEEN CAMERA BODY AND ZOOM LENS

The communication between the camera body 1 and the zoom lens 2 is carried out as follows.

The indication CPU 11 causes the terminal CONT to drop to "L" and reads the open F-number and the minimum F-number data. Thereafter, the terminal CONT and the terminal RES (Fmin3) are both set at "H", so that the lens interface 41 and the lens CPU 30 are reset. Consequently, the indication CPU 11 is transferred to the initial value data inputting state.

The lens CPU 30 sets the initial value data read through the zoom code member 37 or the calculated initial value data in a shift register within the lens interface 41, asynchronously with the clock signal output from the camera body 1.

The initial value data set in the shift register is successively output from the terminal DATA synchronously with the clock signal from the camera body 1. The old data communication mentioned above is carried out by hardware within the lens interface 41. In the illustrated embodiment, 19 byte data is transferred to the camera body 1.

Upon completion of the old data communication, the terminal $\overline{KAFEND}$ of the lens interface 41 drops to "L" which indicates the completion of the old data communication. As a result, the lens CPU 30 is ready to receive a commencement signal for a new data communication from the camera body 1.

When the lens CPU 30 receives a signal for the commencement of a new data communication from the camera body 1, the terminal DATA (Fmin2) which has been "H" drops to "L" and then again returns to "H" thereafter. This makes it possible to commence the new data communication.

In the new data communication, data is transferred from the zoom lens 2 to the camera body 1 or from the camera body 1 to the zoom lens 2 in accordance with the command code output from the camera body 1.

The new communication is carried out synchronously with the clock signal output from the zoom lens 2 (clock pulse generating circuit 43). For example, the lens CPU 30 outputs the clock signal from the terminal SCK and receives the data output from the camera body 1 through the terminal DATA.

If the data is data reading command, the lens CPU 30 first outputs the receipt acknowledgement signal and then the data designated by the command, from the terminal DATA. When the data output is finished, the lens CPU 30 causes the terminal DATA to first drop to "L" and then become "H" again, so that the completion of the data output is transmitted to the camera body 1.

The command code and the data transferred between the zoom lens 2 and the camera body 1 are for example as shown in table 1 below.

TABLE 1

| zoom lens → camera body | |
|---|---|
| AF information | 0011.0001(31H) |
| AF information | 0011.0010(32H) |
| all data | 0011.0011(33H) |
| each single bite | 0101.XXXX(5XH) |
| lens information 1 | 0110.0000(60H) |
| lens information 2 | 0110.0001(61H) |
| camera body → zoom lens | |
| focal length information fWide | 0110.0010(62H) |
| focal length information fTele | 0110.0011(63H) |
| focal length information fX(present) | 0110.0100(64H) |
| lens drive information | 0110.0110(66H) |

TABLE 1-continued

| | |
|---|---|
| lens accommodation | 1001.0000(90H) |
| lens return | 1001.0001(91H) |
| PH ON | 1001.0010(92H) |
| PH OFF | 1001.0011(93H) |
| effective AF F No. | 1001.0100(94H) |
| switching command | 1100.1000(C8H) |
| sleep | 1100.0001(C1H) |
| test mode | 1111.XXXX(FXH) |

The main operation of the camera system of the present invention will be explained below in more detail.

TIMER ROUTINE OF INDICATION CPU

Figure 5:
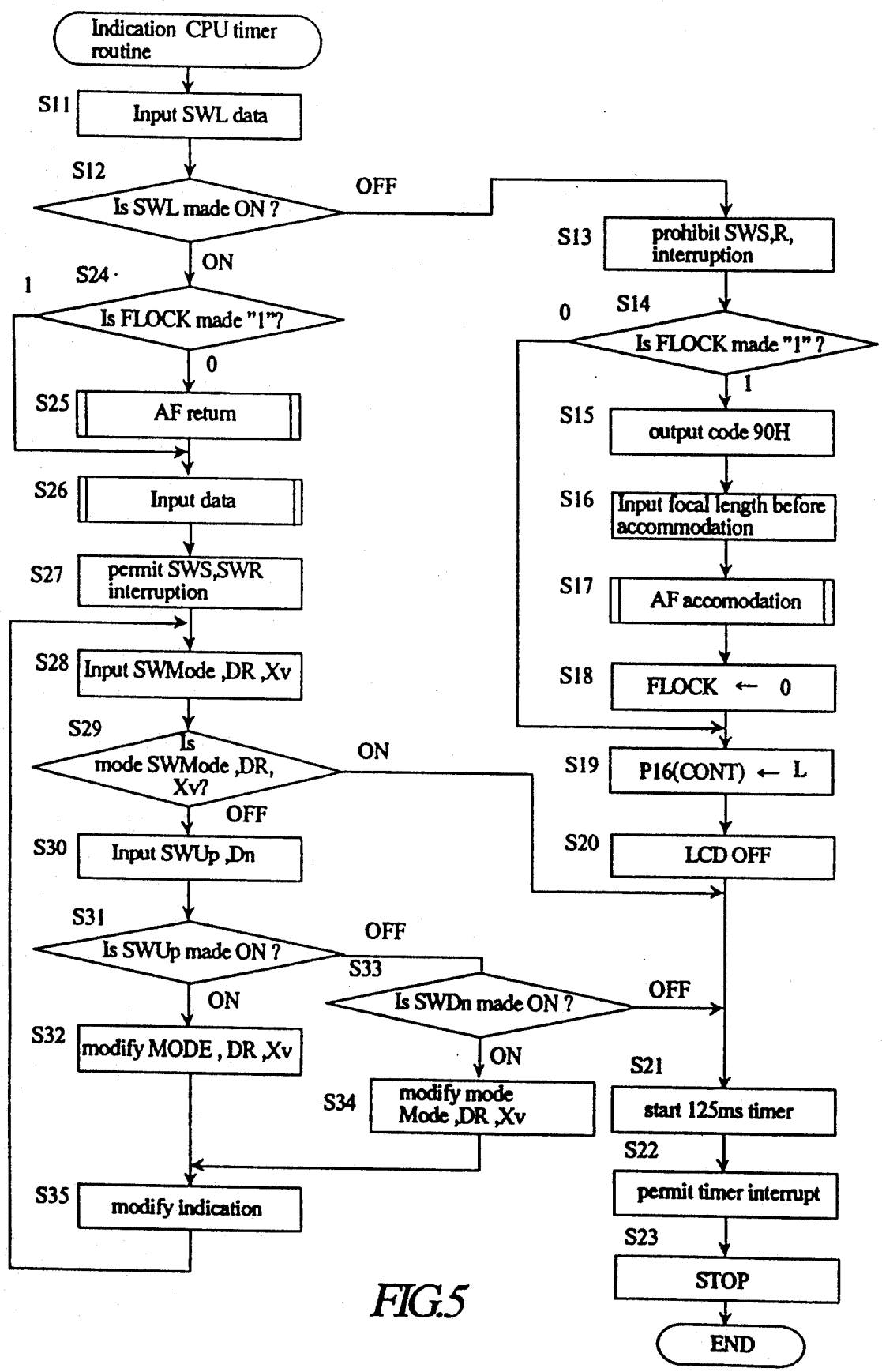
FIG. 5 is a flow chart of a timer routine of an indication CPU of a camera body.

The main operation (timer routine) of the indication CPU 11 will be explained with reference to FIG. 5. The main operation is performed by the indication CPU 11 in accordance with a program stored in the internal ROM 11a is the indication CPU 11.

The indication CPU 11 checks whether the lock switch SWL is turned ON or OFF at steps S11 and S12. If the lock switch SWL is turned OFF, the interruption of the operation by the switch is prohibited (step S13), and then, the state of the lock flag FLOCK is checked to check the accommodation of the lens (step S14).

When the lock SWL is OFF a picture cannot be taken and the photographing lens is retracted thus realizing a compact and portable camera.

To this end, in the camera system of the present invention, the zoom lens 2 is automatically retracted to reduce the length thereof by the automatic focusing mechanism 31 and the automatic power zoom mechanism 32 when the lock switch SWL is turned OFF.

However, a photographer may also turn the lock switch SWL OFF when he or she does not desire that the photographing lens in the camera be retracted. For instance, the lock switch SWL may be turned OFF to reduce the power consumption while a photographer is waiting for the next shot, and wishes to maintain the focal length and focal point as they are. In such a case, if the photographing lens is automatically retracted when the lock switch SWL is turned OFF, the focal length and focal point will vary requiring the photographer to troublesomely readjust the focal length and focal point.

To prevent this, in the camera system according to the present invention, at the moment when the lock switch SWL is switched from ON to OFF, the focal length and the focal point (axial position of the focusing lens group or the object distance) are memorized and the photographing lens is retracted. When the lock switch SWL is turned ON again the focal length and the focal point, before the retraction of the photographing lens, are automatically obtained regardless of the photographer's intention when the lock switch SWL is turned OFF. Thus, according to the present invention, the problem mentioned above can be eliminated.

In the camera system of the present invention, the retraction and return operations with respect to the automatic focusing mechanism 31 are carried out by the main CPU 10, and the retraction (accommodation) and return operations, with respect to the power zoom mechanism 32, are carried out by the lens CPU 30, respectively. Note that the main CPU 10 and the lens CPU 30 are supplied with electrical power only when the lock switch SWL is turned ON, otherwise no power is supplied thereto. Therefore, the data of the retraction and the return is controlled by the indication CPU 11 which always operates.

The lens retraction (accommodation) operation is effected in steps S15 through S18. Since the zooming operation is controlled by the lens CPU 30, the command code 90H for the accommodation of the lens is sent to the lens CPU 30 and the focal length data, before the accommodation, is input from the zoom code member 37 to the lens CPU 30. Since the automatic focusing mechanism 31 is controlled by the camera body side, the operation is performed by the main CPU 10 in an AF accommodation sub-routine at step S17.

Upon completion of the AF accommodation, the lock flag FLOCK is set at "0" (step S18), and the control proceeds to step S19. If the lens has been already accommodated or retracted, since the lock flag FLOCK is "0," the control skips step S15 through step S18.

At step S19, the terminal P16 (terminal CONT) drops to "L" and then the power source of the lens CPU 30 and the LCD 12 are turned OFF (step S20). Thereafter, the timer routine is intermittently performed at 125 ms cycle (steps S21 through S23). Namely, the operation of steps S11 through S23 is intermittently repeated during the period in which the lock switch SWL is OFF.

If the lock switch SWL is turned ON, the indication CPU 11 judges the state of the lock flag FLOCK at step S24. Since the lock flag FLOCK is "0" when the lock switch SWL is turned ON for the first time, the AF return operation is performed by the main CPU 10 to return the focal point of the photographing lens to the one before the accommodation or retraction (steps S12, S24 and S25).

At step S26, the lens data inputting sub-routine is called to judge the type of attached lens in accordance with the input data. If necessary and if possible, the lens CPU 30 performs the return of the zoom mechanism 31.

Upon completion of the data input operation, interruption of the control by the photometer switch SWS and the release switch SWR is permitted so that the release can be effected. Thereafter, the control proceeds to step S28.

When the mode switch SWM, the drive switch SWDR, the exposure correction switch SWXV, the up-switch SWUP, and the down-switch SWDN are actuated, the changing operation of the mode, etc., and the indication operation of the selected mode are performed at steps S28 through S35.

If none of these switches are actuated, the intermittent operation is performed in accordance with the 125 ms timer operation (steps S29, S31, S33, S21).

INPUT OPERATION OF LENS DATA

The input operation (data communication) of the lens data between the camera body 1 and the zoom lens 2 at step S26 of the timer routine will be described below.

Figure 6A:
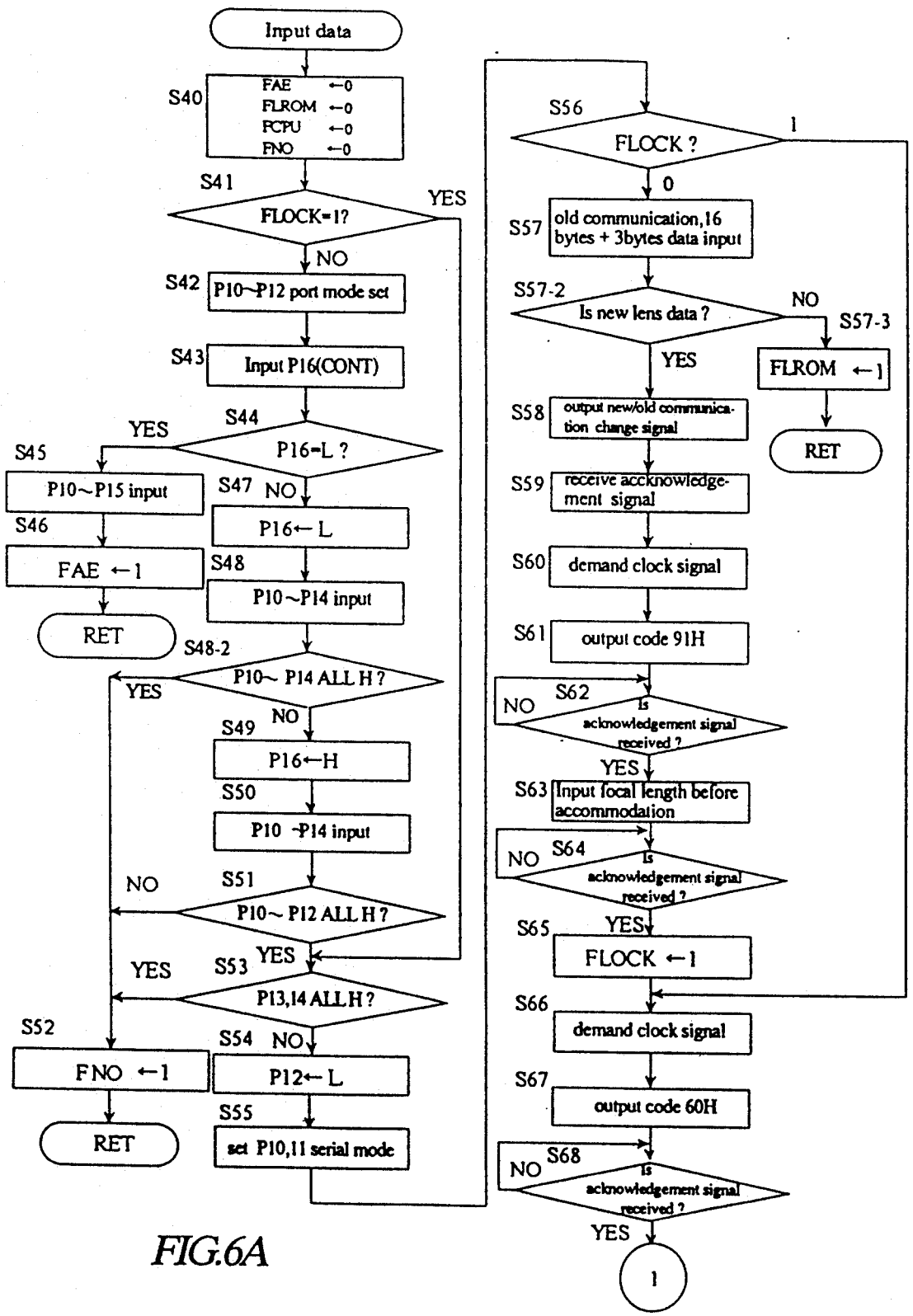
FIGS. 6A, 6B and 6C are flow charts of a data communication of a camera body.
Figure 6B:
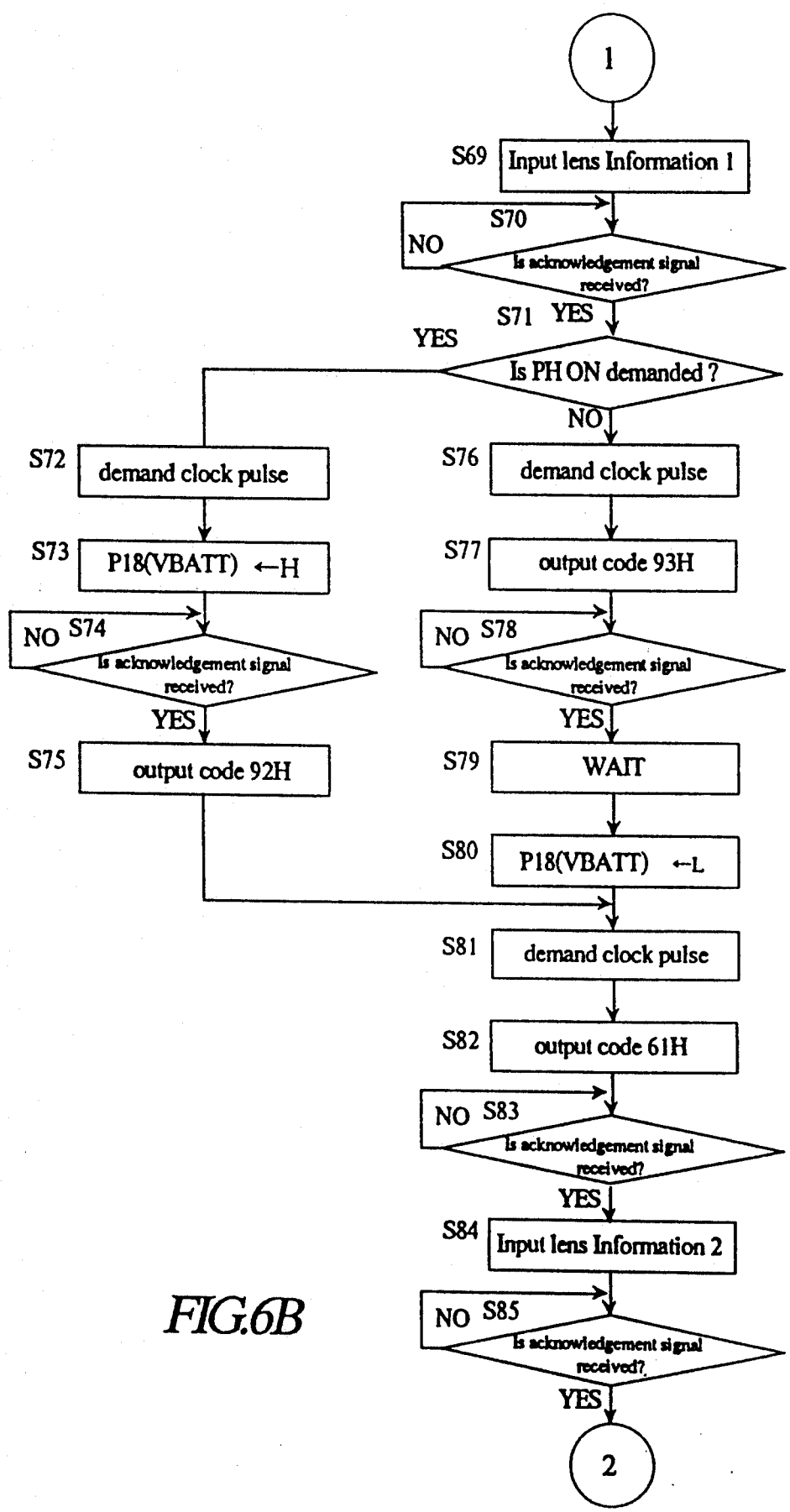
Figure 6C:
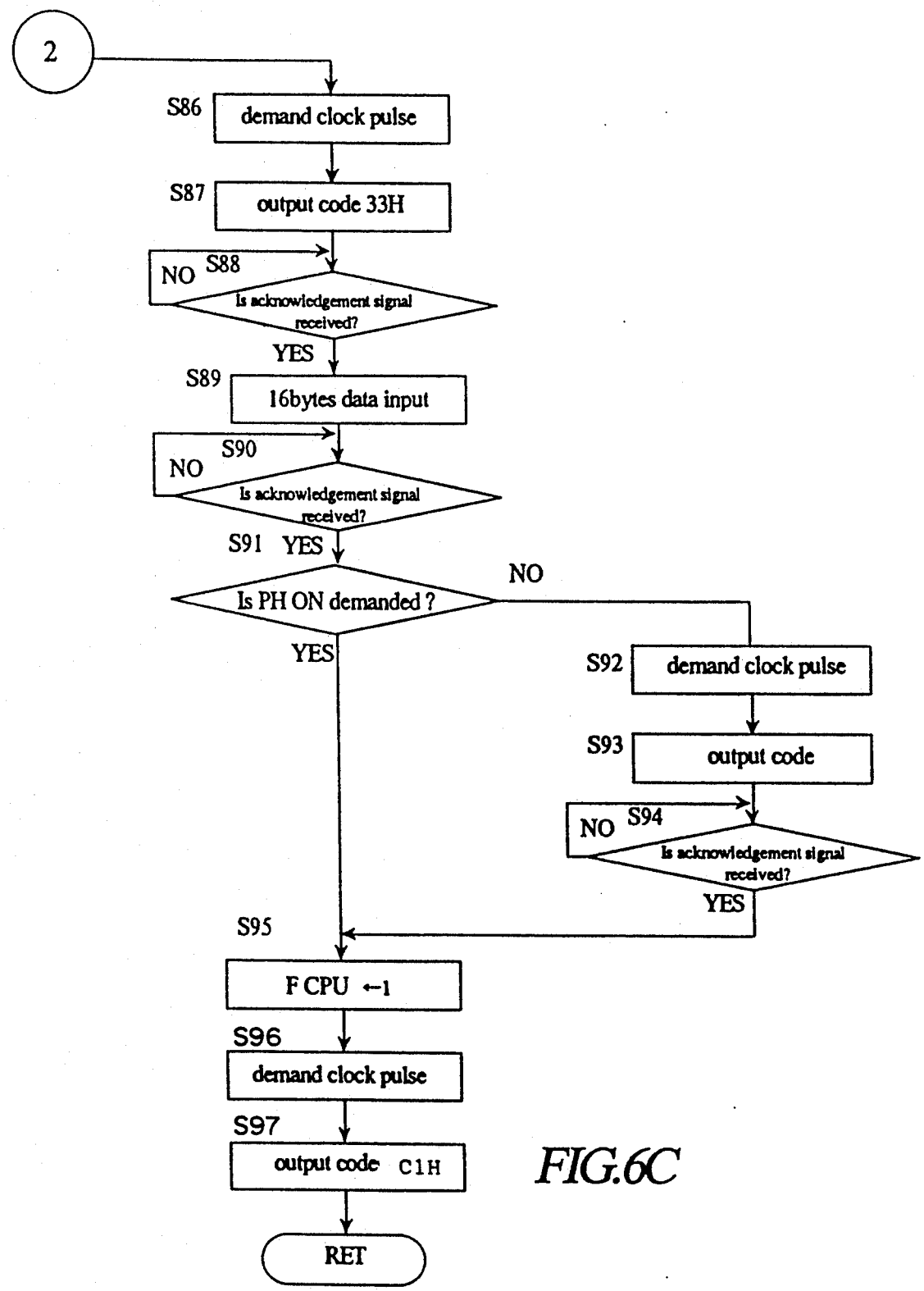

The discussion will first be directed to the operation of the camera body 1 with reference to FIGS. 6A and 6B. This operation is carried out by the indication CPU 11.

First, four lens flags FAE, FLROM FCPU and FNO for discriminating the lens are reset at "0" (step S40). The lens flag FAE identifies a conventional (old) AE lens having no lens ROM. The lens flag FCPU indicates a new AE lens having a lens CPU, for example, the zoom lens 2 having the lens CPU 30 shown in FIGS. 1 and 3, etc. The lens flag FLROM identifies a conventional AE lens having a lens ROM. Lastly, the lens flag FNO determines if the lens is not attached to the camera body or if there is trouble with the photographing lens. The new CPU lens and the AE lens are automatic focusing lenses.

After that, whether or not the lock flag FLOCK is "1" is checked at step 41. Since the control proceeds to step S41 for the first time after the lock switch SWL is turned ON, the flag FLOCK is "0," so that the control proceeds to step S42. Conversely, after the second time and when the lens has a lens CPU, the flag FLOCK is "1," so that the control jumps to step S53.

At step S42 the terminals P10 through P12, which are used for serial communication with the zoom lens 2, are set at the input mode and then the level of the terminal P16 (the contact Cont) is input and checked (steps S43 and S44).

If there is no contact Cont on the mounted lens, the contact Cont on the camera body side comes into contact with the surface of the lens mount and is accordingly grounded to detect that the mounted lens is an old AE lens having no lens ROM.

When the mounted lens is the old AE lens, the levels of the terminals P10 through P15 are input to read the data on the open F number, the maximum F number and the diaphragm A/M switching data, and the old AE lens flag FAE is set at "1" (steps S45 and S46). The control is then returned.

If a photographing lens is not mounted or if a lens having the lens data is mounted, the level of the Cont contact is "H." Consequently, the level of the terminal P16 drops to "L" to stop the supply of electrical power to the lens side. Thereafter, the levels of the other terminals P10 through P15 are input (step S48).

Figure 2:
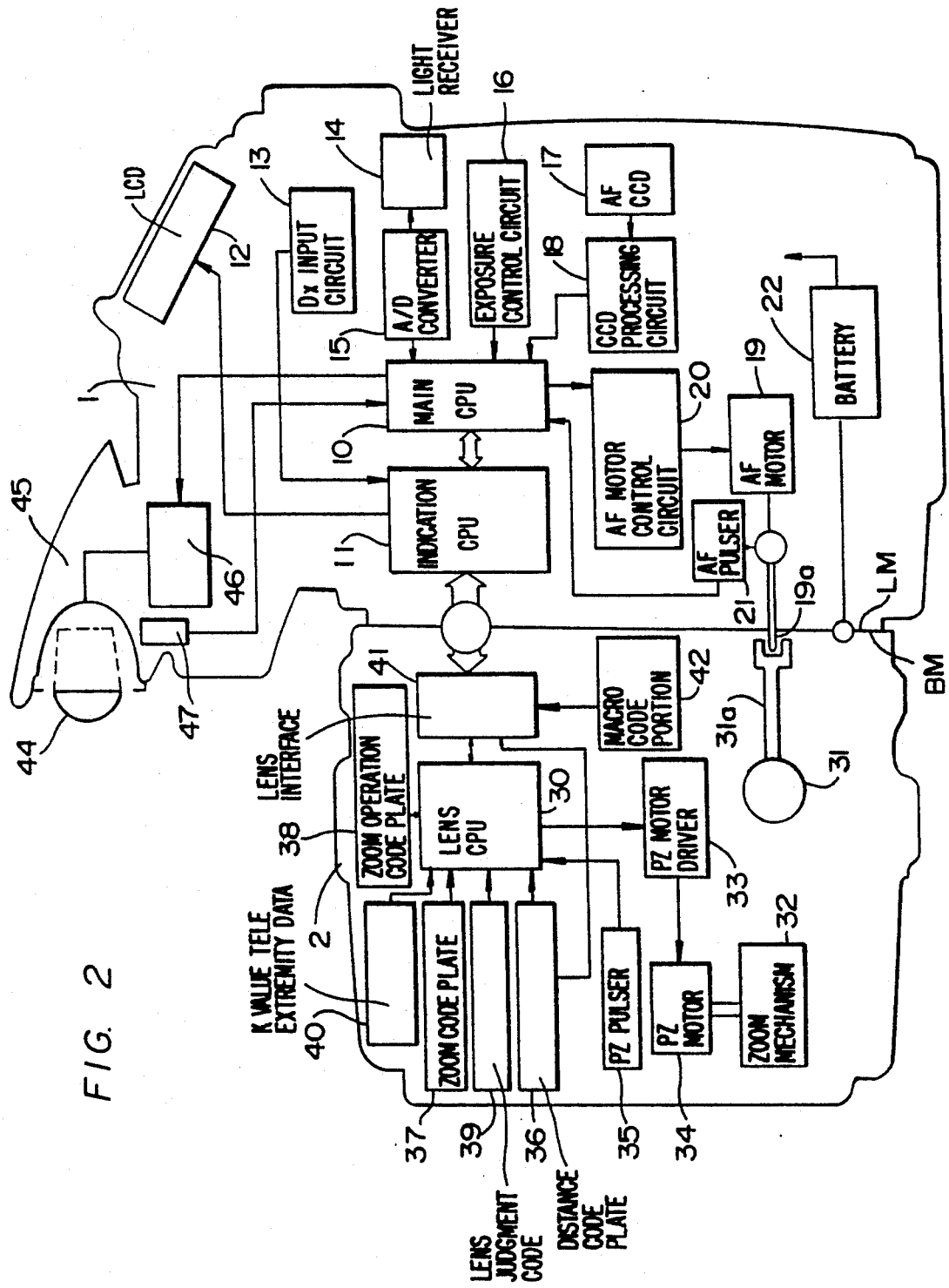
FIG. 2 is a block diagram of a camera system to which the present invention is applied.

As can be seen in FIG. 2, when the transistors Tr are connected to the lens contacts Fmin1 through Fmin3, the open F number can be detected in accordance with the combination of levels of the lens contacts Fmin1 through Fmin3, depending on the combination of ON/-OFF states of the transistors Tr. The maximum F number can be detected in accordance with the combination of lens contact levels Fmax1 and Fmax2, depending on the combination of ON/OFF states of the switches SWFmax1 and SWFmax2. The level of the diaphragm A/M contact is used to detect whether the diaphragm is automatic or manual.

Thereafter, whether the levels of the terminals P10 through P14 are all "H" is checked. If the levels of P10 through P14 are all "H," the no lens flag FNO which represents that no lens is attached is set at "1" (steps S48-2, S52). Thereafter, control is returned.

If any one of the levels of the terminals P10 through P14 is "L," the terminal P16 is set at "H" to supply the power to the zoom lens so that the lens CPU and the lens ROM are activated. Thereafter, the levels of the terminals P10 through P14 are input (steps S49 and S50).

If any one of the levels of the terminals P10 through P12 is "L," the no lens flag FNO is set at "1," since it is then considered that there is some trouble with the photographing lens (lens ROM or lens CPU) (steps S51 and S52).

If all of the levels of the terminals P10 through P12 are "H," whether or not both the levels of the terminals P13 and P14 are "H" is checked at step S53. If both the levels of the terminals P13 and P14 are "H," the no lens flag FNO is set at "1" (step S52), since it is then considered that no photographing lens is attached. The control is then returned.

If at least one of the terminals P13 and P14 is "L," the level of the terminal P12 drops to "L" (step S54), and the terminals P10 and P11 are set at the serial communication mode (step S55), since the mounted lens is a new CPU lens (zoom lens). Thereafter, control proceeds to step S56.

At step S56, whether or not the lock flag FLOCK is "1" is checked. Since FLOCK is "0" when the control proceeds to step S56 for the first time after the lock switch SWL, is turned on the control proceeds to step S57 to perform the old data communication. Conversely, if FLOCK is "1," after the second time, the control skips steps S57 through S65 to step S66 so as not to carry out the old data communication.

At step S57, the lens data of 16 bytes and the rear converter data of three bytes are input through the old communication.

When the input of the data by the old communication is completed, whether or not the lens is the new lens (zoom lens) having the lens CPU based on the input data is checked. If the lens is not the new lens, the lens is the conventional AE lens having the lens ROM, and accordingly the flag FLROM is set at "1" (steps S57-2 and S57-3). Thereafter, control is returned.

If the lens is the new lens, the new/old switching signal is output to the terminal DATA (step S58), so that the clock demand signal is output to the lens side in response to the acknowledgement signal issued from the lens side, whereby the lens CPU 30 outputs the clock signal (steps S59 and S60).

Thereafter, the lens return command code 91H is sent to the lens CPU 30 which is ready for returning the power zoom mechanism at step S61. The control waits until the acknowledgement signal is issued from the lens CPU 30 (step S62)

Upon receipt of the acknowledgement signal, before accommodation, the focal length data is sent to the lens CPU 30 which then returns the power zooming (step S63). When the returning is finished, which can be detected by the issuance of the acknowledgement signal from the lens CPU 30, the lock flag FLOCK is set at "1" (steps S64 and S65). Thereafter, control proceeds to step S66.

At step S66 the clock demand signal is output so that the lens CPU 30 outputs the clock signal. The command code (lens information 1) 60H is output synchronously with the clock signal, and the control does not proceed until the acknowledgement signal is issued (steps S67 and S68). The command code 60H is used to read lens information including the switch setting data on the lens side and the power hold demand signal, etc.

Upon receipt of the acknowledgement signal the lens information output from the lens CPU 30 is received (step S69). The completion of the receipt of the lens information is detected by the receipt of the acknowledgement signal fed from the lens CPU 30 (step S70).

Upon receipt of the acknowledgement signal it is checked whether or not the transferred data demands the power hold at step S71. If there is a power hold demand, the lens CPU 30 is requested to output the clock signal (step S72). Thereafter, the level of the terminal P18 becomes "H" and the control does not proceed until the acknowledgement signal is issued from the lens CPU 30 (steps S73 and S74).

Upon receipt of the acknowledgement signal, the power hold-ON code 92H is output (step S75). Thereafter, the control proceeds to step S81.

If there is no power hold demand at step S71, the output of the clock signal is demanded at step S76. Thereafter, the power hold-OFF code 93H is output synchronously with the clock signal (step S77). After that, whether or not the acknowledgement signal is output from the lens CPU 30 is checked at step S78.

Upon receipt of the acknowledgement signal, the level of the terminal P18 becomes "L", after a lapse of predetermined time (steps S79 and S80), to stop the supply of the power to the PZ motor 34. Then, the control proceeds to step S81.

At step S81, the output of the clock signal is demanded. The demand code 61H which demands the lens information 2 is output synchronously with the clock signal at step S82. Thereafter, whether or not the acknowledgement signal is output is checked at step S83.

If the acknowledgement signal is received, the subsequent lens information 2 is then received at step S84. Thereafter, whether or not the acknowledgement signal is output is checked at step S85.

If the acknowledgement signal is received at step S85, the clock signal is demanded at step S86. The demand code 33H for demanding all the data is output synchronously with the clock signal at step S87. Thereafter, whether or not the receipt acknowledgement signal is received is checked at step S88.

If the receipt acknowledgement signal is received, the subsequent data for 16 bytes is input at step S89. Thereafter, whether or not the transmission completion acknowledgement signal is received is checked at step S90.

If the transmission completion acknowledgement signal is received at step S90, whether or not there is a power hold demand is checked at step S91. If there is a power hold demand, the new AE lens flag FCPU is set at "1" (step S95). The indication CPU 11 demands the clock signal from the lens CPU 30. Thereafter, a sleep-code (C1H) is output synchronously with the clock signal of the lens CPU 30, and the control is returned.

Conversely, if there is no power hold demand at step S91, the clock signal is demanded at step S92 and a predetermined code is output (step S93). Thereafter, whether or not the receipt acknowledgement signal is received is checked at step S94. If the receipt acknowledgement signal is received, the new CPU lens flag FCPU is set at "1".

The indication CPU 11 demands the clock signal from the lens CPU 30. Thereafter, the sleep code (C1H) is output synchronously with the clock signal of the lens CPU 30 and control is then returned (steps S96, S97).

Namely, the indication CPU 11 causes the lens CPU 30 to sleep every time the communication with the lens CPU 30 is finished.

In the second data inputting operation and those subsequent thereto, since the lock flag FLOCK has been set at "1" at step S65, the checking of whether the lens is the old AE lens, etc. (steps S42 through S51), the old data communication, and the output of the focal length before the accommodation (retraction) at steps S57 through S65 are not carried out. This decreases the communication time in the 125 ms timer operation resulting in reduced power consumption.

MAIN ROUTINE OF LENS CPU

Figure 7:
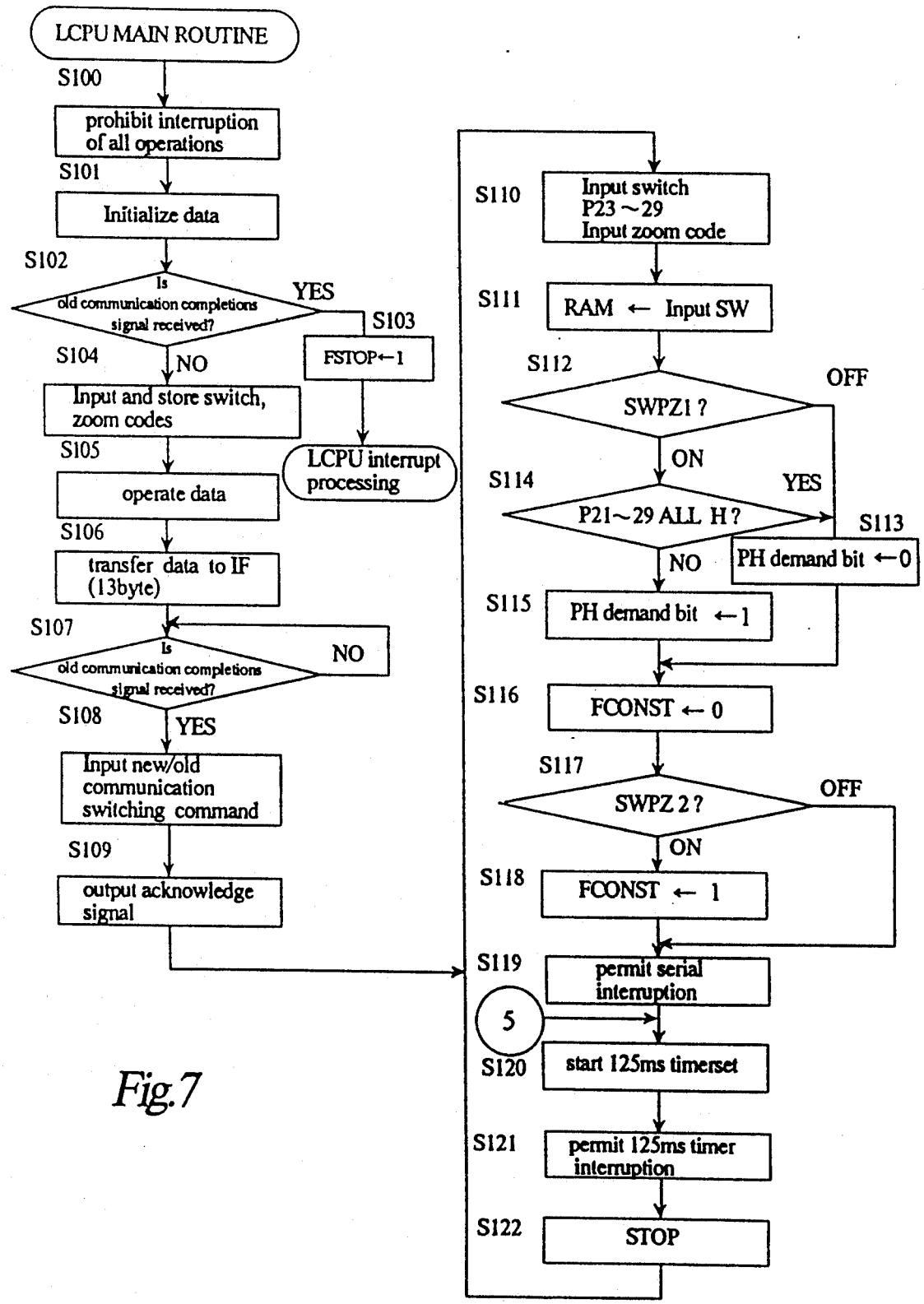
FIG. 7 is a flow chart of a main operation of a lens CPU of a photographing lens.

The main operation of the lens CPU 30 will be described below with reference to FIG. 7.

The lens CPU 30 is supplied with power through the contact CONT by the indication CPU 11 and starts when the reset is released after the levels of the contact Cont and the terminal RES are set at "H" and "L", respectively. The lens CPU 30 performs the initialization after the interruption by all of the operations is prohibited (steps S100 and S101).

After the initialization is completed, whether or not the old communication completion signal is output from the lens interface 41 is checked, that is, whether or not the level of the terminal $\overline{\text{KAFEND}}$ is "L" is checked at step S102. If the old communication completion signal is output, the stop flag FSTOP is set at "1" and then the lens CPU interruption starts (step S103).

Conversely, if the old communication completion signal is not output, which means that the control is still in the old communication, the states of the switches are input and stored in the RAM (step S104) to successively perform the predetermined arithmetic operations (step S105). During these operations, the initial value data is loaded in the 24 bit shift register in which the data is shifted and serially output to the indication CPU 11.

Every time the predetermined arithmetic operations are finished, the results of the arithmetic operations (arithmetic data) are output to the lens interface 41 (step S106). The arithmetic data output to the lens interface 41 is then loaded in the 24 bit shift register 56 by hardware and successively transferred to the indication CPU 11 through the terminal DATA, as mentioned above.

Upon completion of the output of the arithmetic data to the indication CPU 11, whether or not the old communication completion signal is output is checked at step S107. In this state, the calculated data transferred to the lens interface 41 is transferred to the indication CPU 11. If a rear converter is provided, the data for three bytes is transferred from the rear converter to the indication CPU 11.

When the transfer of the 19 bytes data (including the initial data of three bytes, the calculated data of 13 bytes and the rear converter data of three bytes) is completed, the lens interface 41 outputs the old communication completion signal. Namely, the terminal $\overline{\text{KAFEND}}$ drops to "L".

When the old communication completion signal is received, the new/old communication switching signal is input from the indication CPU 11 (step S108) and the acknowledgement signal is issued (step S109). This transfers the old communication to a new communication.

In the new communication, the levels of the terminals P23 through P29 are input at step S110 and the states of the switches are memorized in the internal RAM (step S111).

Thereafter, the state of the power zoom switch SWPZ1 is checked to check the power zoom mode or the manual zoom mode at step S112. If the power zoom switch SWPZ1 is turned OFF, the mode is the manual zoom mode so that the power hold demand bit (flag) is set at "0" to stop the supply of power to the PZ motor 34. Thereafter, control proceeds to step S116.

If the power zoom switch SWPZ1 is turned ON, the mode is the power zoom mode, and accordingly, the levels of the terminals P21 through P29 are input to check the states of the switches relating to the zooming operation (step S114). If the levels of all of the terminals P21 through P29 are "H," since no operation for the power zooming is effected, the power hold demand bit is set at "0". Thereafter, the control proceeds to step S116.

If the level of any of the terminals P21 through P29 is "L," since the switch connected to the associated terminal relating to the power zooming is turned ON, the power hold demand bit is set at "1" to supply the PZ motor 34 with power (step S115). Thereafter, control proceeds to step S116.

At step S116, the constant image magnification flag FCONST is set at "0," and then, the control proceeds to step S117. The constant image magnification flag FCONST detects whether or not the constant image magnification mode is set. In the illustrated embodiment, the constant image magnification mode referred to means a mode in which when an object at an object distance D is in focus at a specific focal length f, even if there is a small change $\Delta$ D in the object distance, the power zooming is controlled to adjust the focal length f' to thereby satisfy the following relationship;

$$D/f=(D+\Delta D)/f'$$

At step S117, whether or not the power zoom switch SWPZ2 is turned ON is checked. If the power zoom switch SWPZ2 is turned ON, the constant magnification flag FCONST is set at "1," (step S118) and then, the control proceeds to step S119. Conversely, if no power zoom switch SWPZ2 is turned ON, the control directly proceeds to step S119 without setting the constant magnification flag FCONST "1."

After that, at step S119, serial interruption is permitted. Thereafter, the timer operation is set to intermittently perform the routine of steps S110 through S122 (steps S120 and S121) at 125 ms cycle. Thereafter, the operation stops at step S122. The lens CPU 30 performs the operations of steps S110 through S122 for every 125 ms in accordance with the setting of the timer operation.

SERIAL INTERRUPTION OF LENS CPU

Figure 8A:
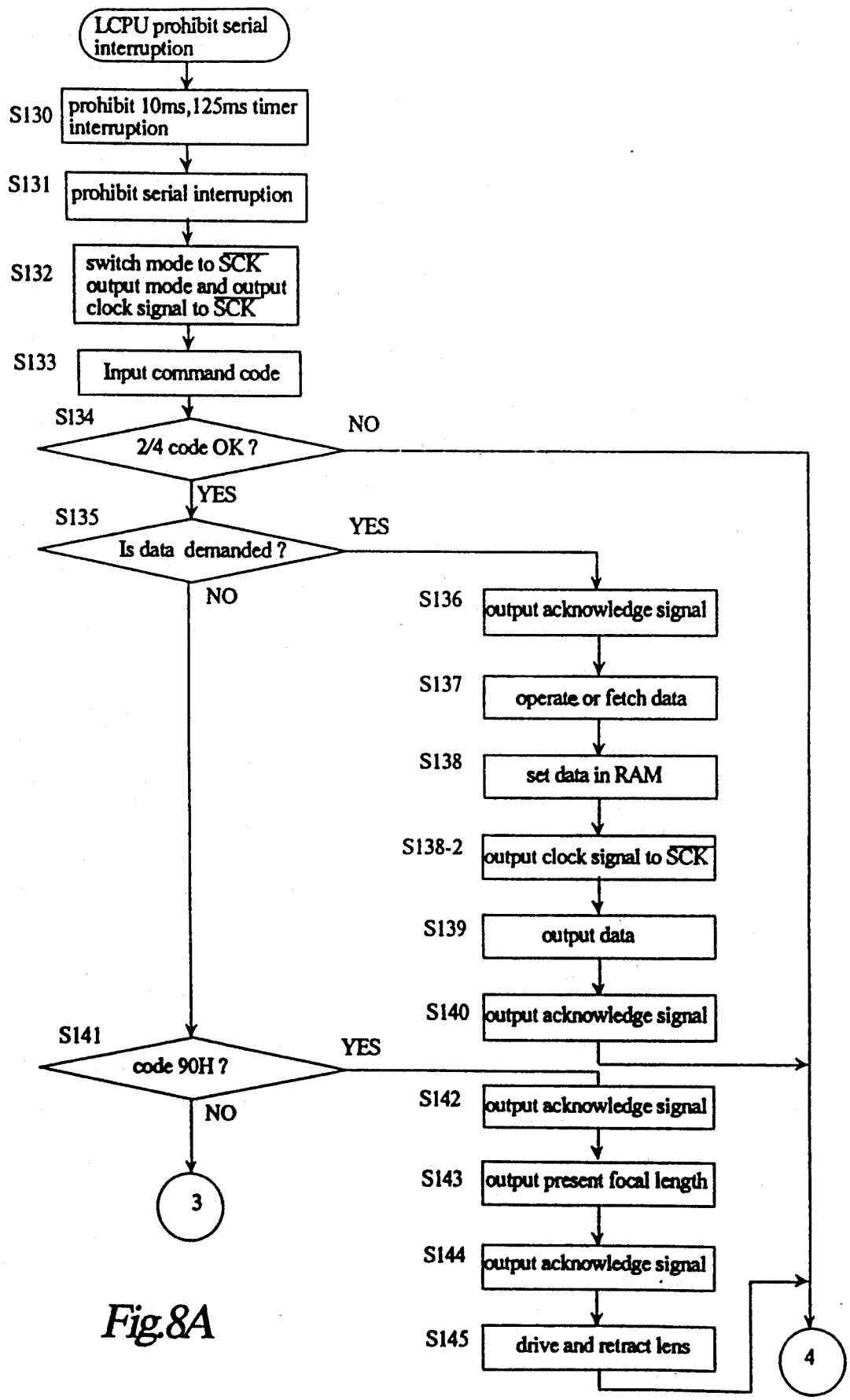
FIGS. 8A, 8B and 8C are flow charts of a data communication of a photographing lens; and, FIG. 9 is a flow chart of an arithmetic operation of an aberration correction data, according to the present invention.
Figure 8B:
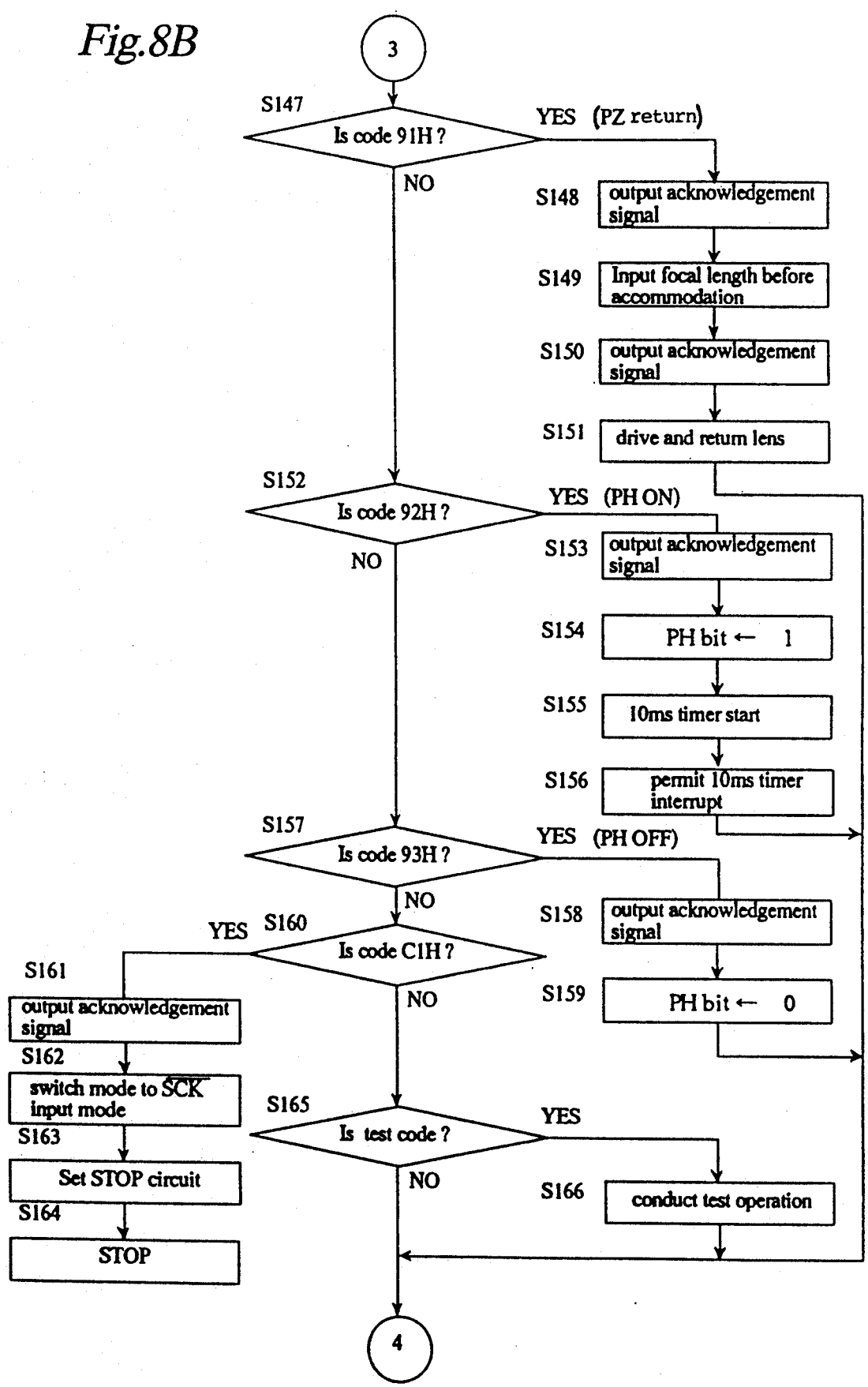
Figure 8C:
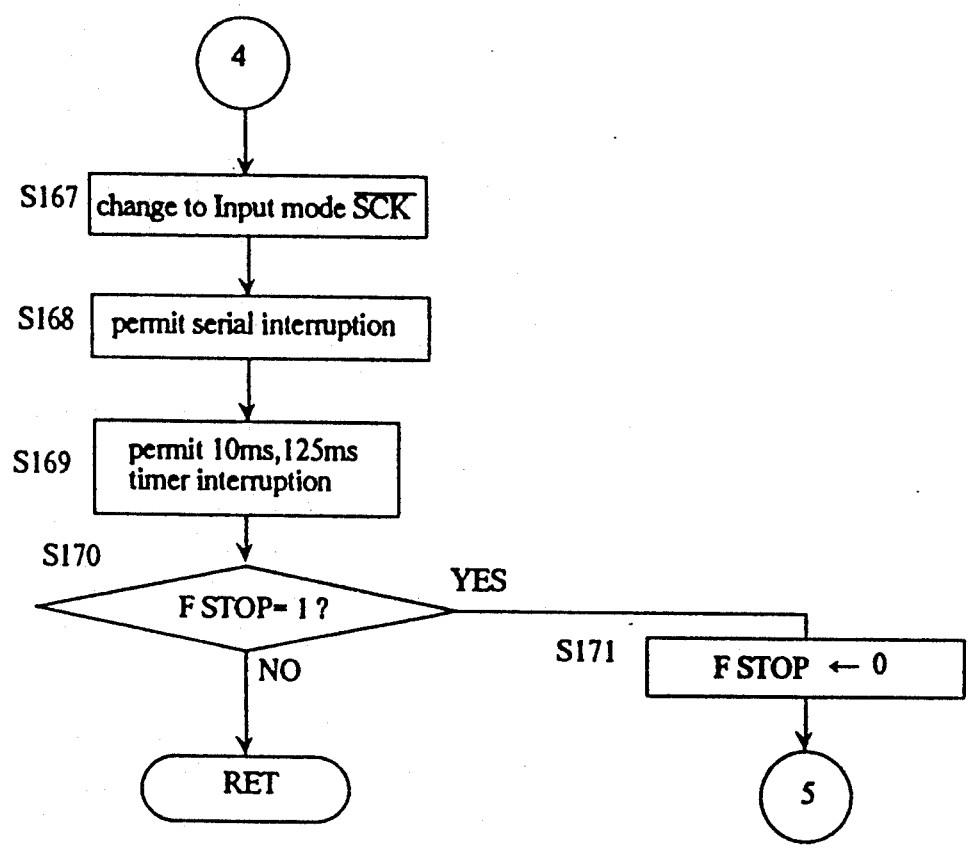

FIGS. 8A through 8C show flow charts for the new communication operation when the serial communication is interrupted by the indication CPU 11 of the camera body 1. When the indication CPU 11 causes the level of the terminal DATA to drop to "L", the lens CPU 30 enters the new communication operation.

First, the lens CPU 30 prohibits the timer interruption by the 10 ms timer and the 125 ms timer and the serial interruption (steps S130 and S131). Note that the 10 ms timer interruption is a power zoom control operation in which when the serial interruption is permitted, the power zooming is controlled at an interval of 10 ms.

Thereafter, the mode is switched to the $\overline{SCK}$ output mode in which the clock signal is output from the lens CPU 30 to output the serial clock signal to the terminal $\overline{SCK}$ (step S132). The communication with the camera body 1 is carried out synchronously with the clock signal output from the photographing lens 2.

At step S133, the command code from the indication CPU 11 is input. Thereafter, whether or not the 2/4 code of the command code thus input is correct is checked at step S134. The 2/4 code means the first four bits of the command code, of which two bits are always "H" and the remaining bits (two bits) are always "L."

If these requirements are not satisfied, no operation is performed as an input error of the command code and the control jumps to step S167. At step S167, the mode is switched to the $\overline{SCK}$ input mode in which the serial clock is input from the camera body side. Thereafter, the 10 ms timer interruption and the 125 ms timer interruption and the serial interruption are permitted (steps S168 and S169). At 170, if the stop flag FSTOP is "0," the control is directly returned and if the stop flag FSTOP is "1," the control is returned to step S120 of the CPU main routine shown in FIG. 7 after the stop flag FSTOP is set at "0" (step S171).

If the 2/4 code is correct, whether or not the command code is the data demand signal is checked at step S135. If the command code is the data demand signal, the acknowledgement signal is output to calculate the demanded data or to input the data of the code plate and the switches etc., to store the data in the internal RAM (steps S136 through S138).

The stored data is serially output synchronously with the $\overline{SCK}$ clock signal at step S139. Upon completion of the output of the stored data, the acknowledgement signal is output to complete the data transfer (steps S138-2, S139 and S140). Thereafter, control proceeds to step S167.

If the first four bits are not the command code, whether the latter is code 90H, 91H, 92H, 93H, the sleep code or the test code is checked (steps S141, step S147, step 152, step 157, step S160 and step S165).

If the command code is the code 90H (lens accommodation), the acknowledgement signal is sent to the indication CPU 11 (step S142). Thereafter, the present focal length data is sent from the zoom code plate 37 to the indication CPU 11 (step S143). Upon completion of the feed of the focal length data to the indication CPU 11, the acknowledgement signal is output to accommodate or retract the photographing lens (steps S144 and S145). Thereafter, control proceeds to step S167.

If the command code is the code 91H (lens return), the receipt acknowledgement signal is sent to the indication CPU 11 (step S148). Thereafter, the focal length data before accommodation is input from the indication CPU 11 (steps S149). Upon completion of the input of the focal length data before accommodation, the acknowledgement signal is output to finish the input of the focal length data before accommodation (step S150). Thereafter, the PZ motor 34 is driven to set the focal length to be the focal length before accommodation at step S151. Thereafter, the control proceeds to step S167.

If the command code is the code 92H (power hold ON), the receipt acknowledgement signal is output at step S153. Thereafter, the power hold demand bit PHbit is set at "1" (step S154), and the 10 ms timer begins permitting the 10 ms timer interruption (steps S155 and S156). Thereafter, control proceeds to step S167.

If the command code is the code 93H (power hold OFF), the acknowledgement signal is output (steps S157 and S158), and the power hold bit is reset to "0" (step S159). Thereafter, the control proceeds to step S167.

If the command code is none of the codes 90H, 91H, 92H and 93H, whether or not the command code is the sleep code C1H is checked at step S160. If the command code is the sleep code C1H, the receipt acknowledgement signal is output to change the mode to the $\overline{SCK}$ input mode in which the level of the terminal $\overline{CE}$ drops to "L" (steps S161 and S162). Consequently, the control stops. Note that the "sleep" referred to herein means that control does not proceed.

The lens CPU 30, which sleeps, is driven by the indication CPU 11 or the zoom switch SWAP3, SWPZ1 or SWPZ2, etc. Namely, for instance, if the clock signal is input to the terminal $\overline{SCK}$ from the indication CPU 11 and the terminal DATA drops to "L", the lens CPU 30 is reset. If the data is input to the terminal DATA, the lens CPU 30 switches the mode to the $\overline{SCK}$ terminal output mode so that the LCPU interruption routine can be carried out. When the zoom switch SWPZ1 or SWPZ2 is turned ON, the power zoom motor 34 is driven to control the power zooming.

If the command code is not the sleep code C1H, whether or not the command code is the test code FXH is checked at step S165. If the command code is the test code FXH, the test operation is performed at step S166, and then, the control proceeds to step S167. If the command code is not the test code FXH, the control skips step S166 to step S167. The test mode is not used while taking a picture, but instead is used to effect a predetermined data communication without mounting the photographing lens to the camera body, for example upon assembly of the lens or adjustment thereafter, etc.

At step S167, the mode is changed to the $\overline{SCK}$ input mode in which the clock signal can be received from the indication CPU 11. Thereafter, the serial interruption, the 10 ms timer interruption and the 125 ms timer interruption are permitted (steps S168 and S169).

Thereafter, at step S170, whether or not the stop flag FSTOP is "1" is checked. If FSTOP is "1," it is reset to "0" (step S171). The control is returned to step S120 of the main routine of the lens CPU. Conversely, if FSTOP is "0" at step S170, the control is directly returned.

CALCULATION OF ABERRATION CORRECTION DATA

Figure 9:
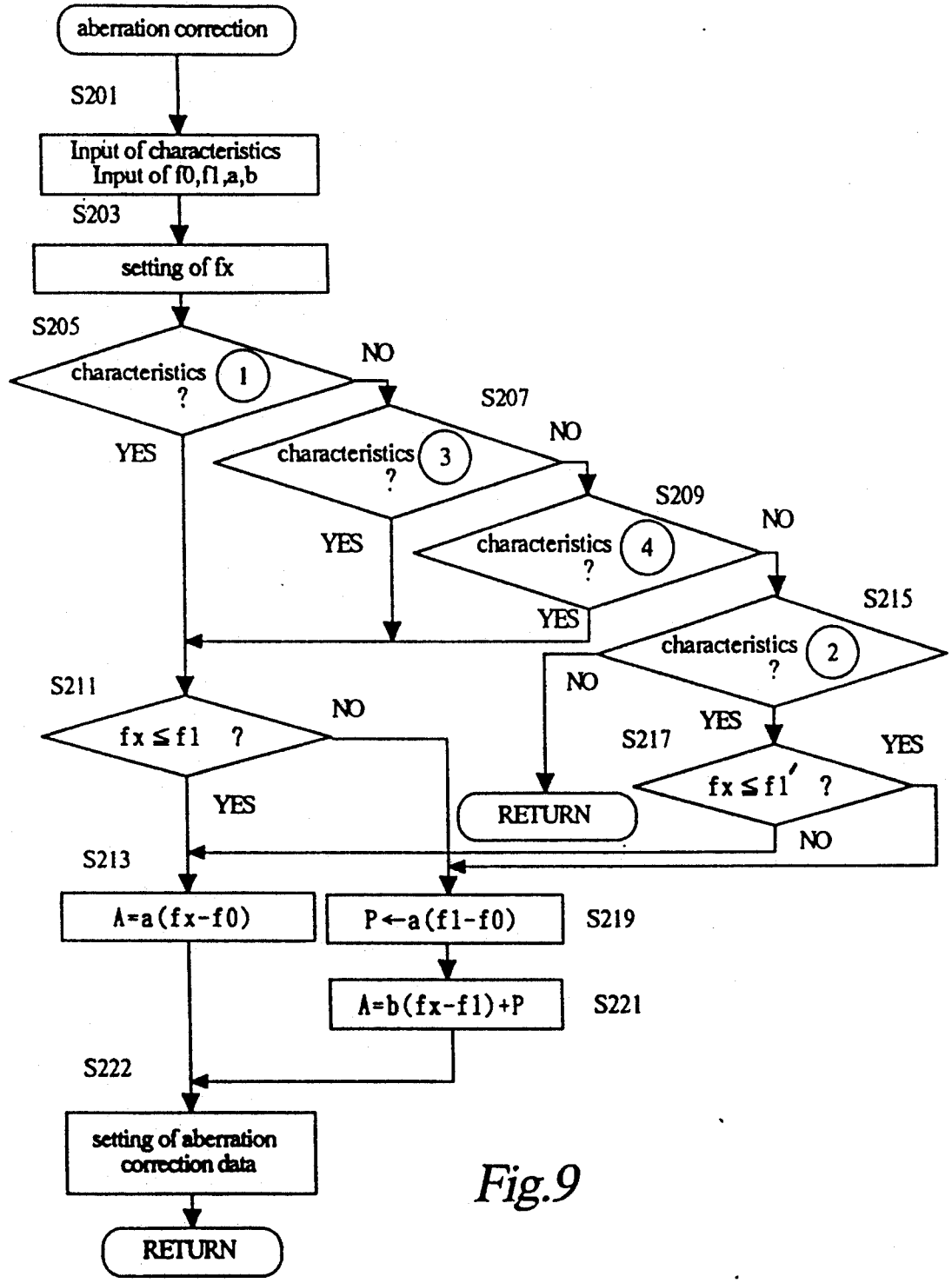

The calculation operation of the lens CPU 30 will be explained below with reference to FIG. 9.

This operation is featured by the calculation of a predetermined aberration correction function corresponding to the present focal length by the lens CPU 30 (arithmetic operating means), based on the function data (coefficient, constant, etc.) and the aberration correction function (formulae) on the aberration correction of the photographing lens stored in the ROM 30A.

The lens CPU 30 reads the characteristics from the internal ROM 30A and sets the reference focal lengths f0, f1 and the coefficients (gradients) an, bn (n=1, 2, 3 and 4), corresponding to the characteristics and present focal length fx in the RAM 30B (steps S201 and S203).

In the case of the characteristics ①; ③ and ④, whether or not the present focal length fx is smaller than the first reference focal length f1 is checked (steps S205, S207, S209, S211). If the present focal length fx is smaller than the first reference focal length f1, the amount of aberration correction (aberration correction data) is calculated by the following equation at step S213;

$$A = an(fx - f0),$$

where n = 1, 3, 4

Conversely, if the present focal length fx is larger than the first reference focal length f1, the amount of aberration correction (aberration correction data) is calculated by the following equation at steps S219 and S221;

$$A = bn(fx - f1) + P$$
$$= bn(fx - f1) + an(f1 - f0).$$

wherein n = 1, 3, 4

In case of the characteristics ②, whether or not the present focal length fx is smaller than the second reference focal length f1' is checked (step S217). If the present focal length fx is smaller than the second reference focal length f1', the amount of aberration correction (aberration correction data) is calculated by the following equation at steps S219 and S221;

$$A = b2(fx - f1') + P$$
$$= b2(fx - f1') + a2(f1' - f0)$$

Conversely, if the present focal length fx is larger than the second reference focal length f1' the amount of aberration correction (aberration correction data) is calculated by the following equation at step S213;

$$A = an(fx - f0),$$

Thus, the aberration correction A can be calculated in the respective characteristics.

Thereafter, the calculated aberration correction data A is set in the RAM 30B as lens data at step S222.

The reference focal lengths f0, f1, the constants a and b, the close distance aberration correction value B, the stop-down aberration correction value C, and the coefficient D are stored in the ROM 30A, as mentioned before. These are set in the RAM 30B as lens data and transferred to the camera body 1.

The focus adjustment (correction of the relative function and the amount of defocus, etc.) is carried out in the camera body in accordance with the aberration correction data A so that a precise focusing can be achieved.

It goes without saying that the present invention is not limited to the illustrated embodiments. This can be seen in that the aberration characteristics are peculiar to the taking lenses and accordingly not limited to those illustrated in FIGS. 1A through 1D. In short, the aberration characteristics corresponding to the taking lenses to be used are stored in the memory of the lens CPU 30 in advance.

As can be understood from the above discussion, according to the present invention, since the aberration correction data is calculated in the taking lens, a precise focus adjustment can be effected, employing the calculated aberration correction data. Furthermore, according to the present invention, since the aberration correction data is calculated in the taking lens, not only the load on the camera body can be effectively reduced but the operation time can be reduced as well.

We claim:

1. A camera system including a camera body and a photographing lens which is detachably mounted to the camera body, wherein said photographing lens comprises:
   a memory means for storing function data on the aberration correction peculiar to said photographing lens;
   an arithmetic operating means for calculating necessary aberration correction data in accordance with the aberration correction function data stored in said memory means; and, an output means for outputting the calculated aberration correction data to said camera body;

wherein the aberration correction data A is obtained by the following equations (1) and (2) when the present focal length fx is smaller and larger than a first reference focal length f0, respectively;

$$A = a(fx - f0) \tag{1}$$

$$A = b(fx - f1) + a(f1 - f0) \tag{2}$$

wherein f1 represents a second reference focal length; a and b represent coefficients; and f0 > f1.

2. A camera system according to claim 1, wherein said photographing lens is a zoom lens.

3. A camera system according to claim 2, wherein said zoom lens comprises a focal length detecting means for detecting the focal length thereof.

4. A camera system according to claim 3, wherein said memory means of said zoom lens stores therein predetermined aberration functions of different kinds of photographing lens aberrations, corresponding to a plurality of focal length zones.

5. A camera system according to claim 4, wherein said arithmetic operating means of said zoom lens selects the aberration correction functions corresponding to the aberration characteristics of said zoom lens and calculates the aberration correction data in accordance with the selected aberration correction function.

6. A camera system according to claim 2, wherein said camera body comprises a focus detecting means for detecting said focus of the zoom lens in accordance with light of an object to be taken incident thereon through said zoom lens so that said focus detecting means corrects the focus in accordance with the aberration correction data input from a taking lens.

7. A camera system according to claim 1, wherein said camera body comprises a focus detecting means for outputting a focus signal in accordance with the image of an object formed by a photographing lens.

8. A camera system according to claim 7, wherein said camera body comprises an arithmetic operating means for calculating focus data in accordance with the focus signal and the aberration correction function input from said photographing lens.

9. A camera system according to claim 1, wherein said camera body and said photographing lens comprise data input and output means for transmitting and receiving the aberration correction data therethrough.

10. A camera system according to claim 9, wherein said taking lens comprises a clock outputting means for outputting a clock signal so that the aberration correction data is transmitted and received synchronously with said clock signal.

11. A camera system including a camera body and a photographing lens which is detachably mounted to the camera body, wherein said photographing lens comprises:
- a memory means for storing function data on the aberration correction peculiar to said photographing lens;
- an arithmetic operating means for calculating necessary aberration correction data in accordance with the aberration correction function data stored in said memory means; and,
- an output means for outputting the calculated aberration correction data to said camera body;
- wherein the aberration correction data A is obtained by the following equations (3) and (4) when the present focal length fx is larger and smaller than a first reference focal length f0, respectively;

$$A = a(fx - f0) \tag{3}$$

$$A = b(fx - f1) + a(f1 - f0) \tag{4}$$

wherein f1 represents a second reference focal length; a and b represent coefficients; and f0 > f1.

12. A camera system according to claim 11, wherein the focus is adjusted by the following equation when the aperture of the photographing lens is between an open aperture and a predetermined value:

$$4(A - 16)/256 + (b - 3)N/256;$$

wherein B represents a close distance aberration correction value, and N represents distance data.

13. A camera system according to claim 11, wherein the focus is adjusted by the following equation when the aperture of the photographing lens is diaphragmed beyond a predetermined value:

$$8(C - 8)/256 + (B - 3)ND/256;$$

wherein B represents a close distance aberration correction value, C represents a stop-down aberration correction value, D represents a coefficient and N represents distance data.

14. A photographing lens detachably mounted to a camera body, comprising:
- a memory means for storing function data on the aberration correction peculiar to said photographing lens;
- an arithmetic operating means for calculating necessary aberration correction data in accordance with the aberration correction function data stored in said memory means; and,
- an output means for outputting the calculated aberration correction data to said camera body;
- wherein the aberration correction data A is obtained by the following equations (1) and (2) when the present focal length fx is smaller and larger than a first reference focal length f0, respectively;

$$A = a(fx - f0) \tag{1}$$

$$A = b(fx - f1) + a(f1 - f0) \tag{2}$$

wherein f1 represents a second reference focal length; a and b represent coefficients; and f0 > f1.

15. A photographing lens according to claim 14, wherein said photographing lens is a zoom lens.

16. A photographing lens according to claim 15, wherein said zoom lens comprises a focal length detecting means for detecting the focal length thereof.

17. A photographing lens according to claim 16, wherein said memory means of said zoom lens stores therein predetermined aberration functions on the different kinds of aberrations of the photographing lens, corresponding to a plurality of focal length zones.

18. A photographing lens according to claim 17, wherein said arithmetic operating means of the zoom lens selects the aberration correction functions corresponding to the aberration characteristics of the zoom lens and calculates the aberration correction data in accordance with the, selected aberration correction function.

19. A photographing lens according to claim 18, wherein said photographing lens comprises a clock outputting means for outputting a clock signal so that the aberration correction data is transmitted and received synchronously with said clock signal.

20. A photographing lens detachably mounted to a camera body, comprising:
- a memory means for storing function data on the aberration correction peculiar to said photographing lens;
- an arithmetic operating means for calculating necessary aberration correction data in accordance with the aberration correction function data stored in said memory means; and,
- an output means for outputting the calculated aberration correction data to said camera body;
- wherein the aberration correction data A is obtained by the following equations (3) and (4) when the present focal length fx is larger and smaller than a first reference focal length f0, respectively:

$$A = a(fx - f0) \tag{3}$$

$$A = b(fx - f1) + a(f1 - f0) \tag{4}$$

wherein f1 represents a second reference focal length; a and b represent coefficients; and f0 > f1.

21. A photographing lens according to claim 20, wherein the focus is adjusted by the following equation when the aperture of the taking lens is between an open aperture and a predetermined value:

$$4(A - 16)/256 + (B - 3)N/256;$$

wherein B represents a close distance aberration correction value, and N represents distance data.

22. A photographing lens according to claim 20, wherein the focus is adjusted by the following equation when the aperture of the photographing lens is diaphragmed beyond a predetermined value:

$$8(C - 8)256 + (B - 3)ND/256;$$

wherein B represents a close distance aberration correction value, C represents a stop-down aberration correction value, D represents a coefficient and N represents a distance data.

* * * * *

UNITED STATES PATENT AND TRADEMARK OFFICE
CERTIFICATE OF CORRECTION

PATENT NO. : 5,227,832

DATED : July 13, 1993

INVENTOR(S) : M. KAWASAKI et al.

It is certified that error appears in the above-indentified patent and that said Letters Patent is hereby corrected as shown below:

At column 22, line 67 (claim 18, line 6), change "the. selected" to ---the selected---.

At column 24, line 23 (claim 22, line 10), delete "a" before "distance".

Signed and Sealed this

Sixteenth Day of August, 1994

Attest:

BRUCE LEHMAN

*Attesting Officer*      *Commissioner of Patents and Trademarks*